US012699887B2

(12) United States Patent　(10) Patent No.: US 12,699,887 B2
Amir et al.　(45) Date of Patent: Aug. 4, 2026

(54) NEUROMORPHIC SYSTEMS FOR COMPUTING CHARACTERISTICS OF A SET

(71) Applicant: INTERNATIONAL BUSINESS MACHINES CORPORATION, Armonk, NY (US)

(72) Inventors: Arnon Amir, San Jose, CA (US); Tapan K. Nayak, San Jose, CA (US)

(73) Assignee: International Business Machines Corporation, Armonk, NY (US)

(\*) Notice: Subject to any disclaimer, the term of this patent is extended or adjusted under 35 U.S.C. 154(b) by 1655 days.

(21) Appl. No.: 15/908,780

(22) Filed: Feb. 28, 2018

(65) Prior Publication Data

US 2019/0266478 A1 Aug. 29, 2019

(51) Int. Cl.
*G06N 3/063* (2023.01)
*G06F 7/544* (2006.01)
*G06N 3/049* (2023.01)

(52) U.S. Cl.
CPC .............. *G06N 3/063* (2013.01); *G06F 7/544* (2013.01); *G06N 3/049* (2013.01)

(58) Field of Classification Search
CPC ........ G06F 7/544; G06F 7/02; G06F 7/06–08; G06F 7/22–26; G06F 7/32–36;
(Continued)

(56) References Cited

U.S. PATENT DOCUMENTS 5,023,833 A * 6/1991 Baum ................... G11C 15/00
365/49.1
5,122,979 A * 6/1992 Culverhouse ............ G06F 7/02
708/207
(Continued)

FOREIGN PATENT DOCUMENTS

CN 101052979 B 6/2013

OTHER PUBLICATIONS

Shin-Hong Ou, Chi-Sheng Lin and Bin-Da Liu, "A scalable sorting architecture based on maskable WTA/MAX circuit," 2002 IEEE International Symposium on Circuits and Systems (ISCAS), 2002, pp. IV-IV, doi: 10.1109/ISCAS.2002.1010426. (Year: 2002).*
(Continued)

*Primary Examiner* — Andrew Caldwell
*Assistant Examiner* — Huy Duong
(74) *Attorney, Agent, or Firm* — Seed Intellectual Property Law Group LLP

(57) ABSTRACT

Neurosynaptic systems for computing characteristics of a set are provided. In various embodiments, a plurality of encoders is provided. Each encoder is adapted to receive a population coded input and generate an encoded output. The encoded output comprises a plurality of segments. Each segment corresponds to one or more binary bits. A winner selection component is adapted to receive the encoded outputs from the plurality of encoders and to perform a method comprising: proceeding from highest order to lowest order of the segments of the encoded outputs of the encoders, performing a bitwise OR operation across all segments of equivalent order; disqualifying each encoded output whose bits do not match the result of the bitwise OR operation across all segments of equivalent order; outputting remaining encoded outputs.

17 Claims, 21 Drawing Sheets

(58) Field of Classification Search
CPC ............ G06N 3/02; G06N 3/04; G06N 3/063;
G06N 3/08; G06N 3/026; G06N 3/0635;
G06N 3/049; G06N 3/0454; G06N
3/0464; G06N 3/047; G06N 3/0475;
G06N 3/0495; G06N 3/0499; G06N
3/0895; G06N 3/09; G06N 3/091; G06N
3/092; G06N 3/094; G06N 3/096; G06N
3/098; G06N 3/0985; G06N 3/045; G06N
3/0455
See application file for complete search history.

(56) References Cited

U.S. PATENT DOCUMENTS

| | | | |
|---|---|---|---|
| 2011/0191398 A1* | 8/2011 | Mueller .................. | G06F 7/544 |
| | | | 708/207 |
| 2011/0251985 A1* | 10/2011 | Waxman ................ | G16H 10/60 |
| | | | 706/20 |
| 2012/0084240 A1 | 4/2012 | Esser et al. | |
| 2015/0193680 A1 | 7/2015 | Chan et al. | |
| 2015/0278680 A1 | 10/2015 | Annapureddy et al. | |
| 2015/0310303 A1* | 10/2015 | Andreopoulos ....... | G06V 20/46 |
| | | | 382/158 |
| 2016/0055408 A1 | 2/2016 | Akopyan et al. | |
| 2016/0086076 A1* | 3/2016 | Alvarez-Icaza Rivera .................. | |
| | | | G06N 3/06 |
| | | | 706/25 |
| 2016/0125289 A1 | 5/2016 | Amir et al. | |
| 2016/0224890 A1 | 8/2016 | Friedman et al. | |

OTHER PUBLICATIONS

A. Andreopoulos, R. Alvarez-Icaza, A. S. Cassidy and M. D. Flickner, "A low-power neurosynaptic implementation of Local Binary Patterns for texture analysis," 2016 International Joint Conference on Neural Networks (IJCNN), 2016, pp. 4308-4316, doi: 10.1109/IJCNN.2016.7727762. (Year: 2016).*

C. Zhao, Y. Yi, J. Li, X. Fu and L. Liu, "Interspike-Interval-Based Analog Spike-Time-Dependent Encoder for Neuromorphic Processors," in IEEE Transactions on Very Large Scale Integration (VLSI) Systems, vol. 25, No. 8, pp. 2193-2205, Aug. 2017, doi: 10.1109/TVLSI.2017.2683260. (Year: 2017).*

J. Li, C. Zhao, K. Hamedani and Y. Yi, "Analog hardware implementation of spike-based delayed feedback reservoir computing system," 2017 International Joint Conference on Neural Networks (IJCNN), 2017, pp. 3439-3446, doi: 10.1109/IJCNN.2017.7966288. (Year: 2017).*

A. Andreopoulos, H. J. Kashyap, T. K. Nayak, A. Amir and M. D. Flickner, "A Low Power, High Throughput, Fully Event-Based Stereo System," 2018 IEEE/CVF Conference on Computer Vision and Pattern Recognition, 2018, pp. 7532-7542, doi: 10.1109/CVPR. 2018.00786. (Year: 2018).*

Holdsworth, Brian, and Clive Woods. Digital Logic Design, Elsevier Science & Technology, 2002, p. 127-128, section 5.15, figure 5.26 (Year: 2002).*

C.-H. Wu, T.-S. Chen, D.-Y. Lee, T.-T. Liu and A.-Y. Wu, "Low-latency Voltage-Racing Winner-Take-All (VR-WTA) circuit for acceleration of learning engine," 2017 International Symposium on VLSI Design, Automation and Test (VLSI-DAT), 2017, pp. 1-4, doi: 10.1109/VLSI-DAT.2017.7939641. (Year: 2017).*

Vogelstein, R. J., Mallik, U., Culurciello, E. et al. (2007). A multichip neuromorphic system for spike-based visual Information processing. Neural computation, 19(9), 2281-2300.

Marinov, C. A., & Calvert, B. D. (2003). Performance analysis for a K-winners-take-all analog neural network: basic theory. IEEE Transactions on Neural Networks, 14(4), 766-780.

Yu et al., "Biophysiologically plausible implementations of the maximum operation. Neural Computation", Neural Computation 14, Dec. 1, 2002, pp. 2857-2881.

\* cited by examiner

1500

NEUROMORPHIC SYSTEMS FOR COMPUTING CHARACTERISTICS OF A SET

BACKGROUND

Embodiments of the present disclosure relate to neurosynaptic networks, and more specifically, to neuromorphic systems for computing characteristics of a set such as largest value.

BRIEF SUMMARY

According to embodiments of the present disclosure, neurosynaptic systems for computing characteristics of a set are provided. In various embodiments, a plurality of encoders is provided. Each encoder is adapted to receive a population coded input and generate an encoded output. The encoded output comprises a plurality of segments. Each segment corresponds to one or more binary bits. A winner selection component is adapted to receive the encoded outputs from the plurality of encoders and to perform a method comprising: proceeding from highest order to lowest order of the segments of the encoded outputs of the encoders, performing a bitwise OR operation across all segments of equivalent order; disqualifying each encoded output whose bits do not match the result of the bitwise OR operation across all segments of equivalent order; outputting remaining encoded outputs.

According to embodiments of the present disclosure, methods of and computer program products for computing characteristics of a set are provided. A plurality of population coded inputs is received. A plurality of encoded output is generated from the plurality of population coded inputs, the encoded outputs each comprising a plurality of segments, each segment corresponding to one or more binary bits. Proceeding from highest order to lowest order of the segments of the encoded outputs of the encoders, a bitwise OR operation is performed across all segments of equivalent order. Each encoded output whose bits do not match the result of the bitwise OR operation across all segments of equivalent order is disqualified. Remaining encoded outputs are output.

DETAILED DESCRIPTION

Figure 1:
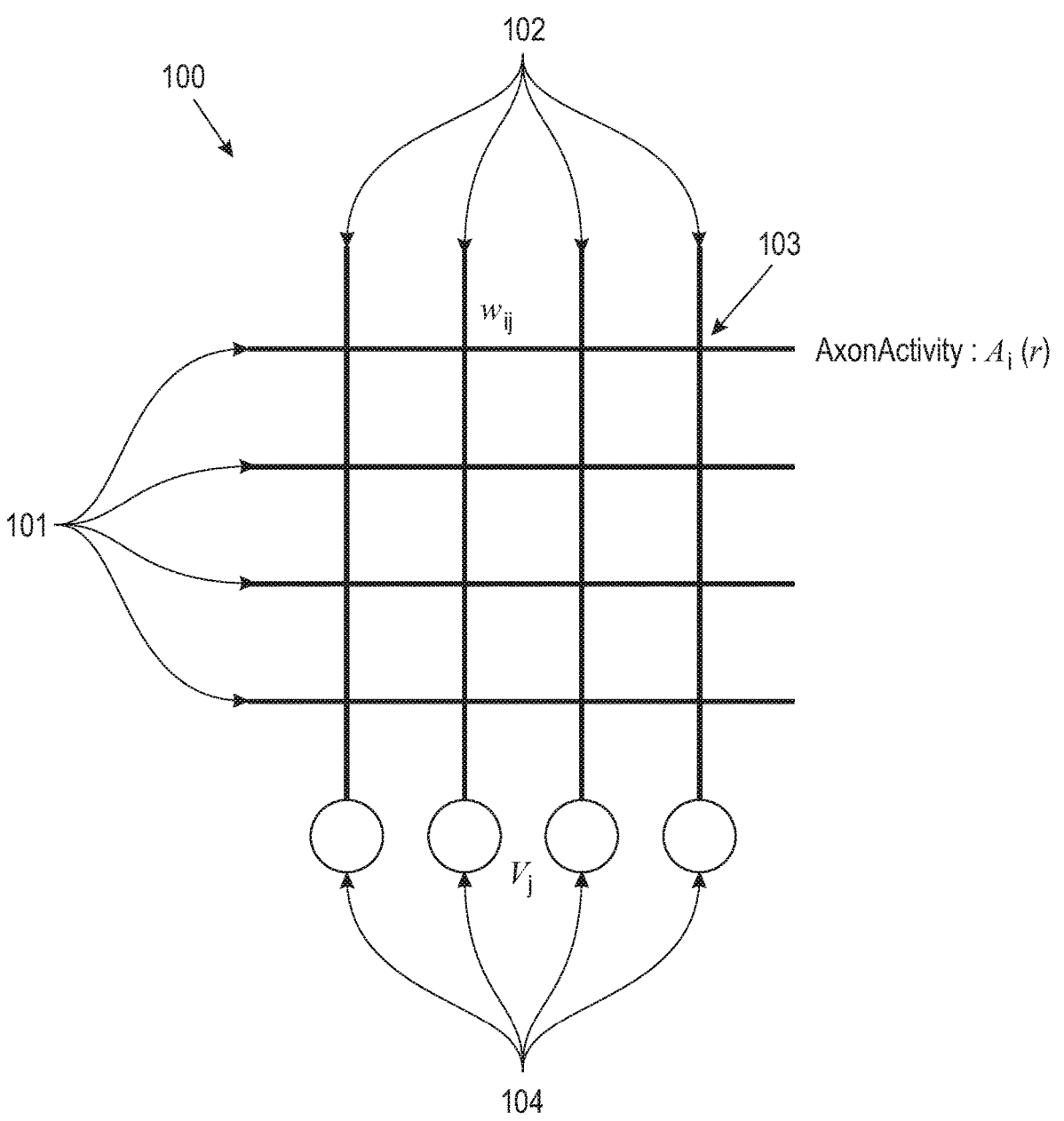
FIG. 1 depicts a neurosynaptic core according to embodiments of the present disclosure.

The present disclosure provides topologies for networks that find the largest value among a set of inputs in a spiking neural network, which may be referred to as Winner Takes All (WTA). Such networks are useful in neuromorphic systems when the system has to make a decision based on input values received from multiple sources, and the decision is based on the strongest input value it receives. One example of such a network is an object (e.g., image or audio) classifier. In general, the classifier receives some input features, measurements and other attributes of the input objects, and assigns a label to the object that designates the object class.

A classifier for n different classes, such as a deep neural network or a convolution network, generally has n outputs. Each of these outputs associates a score that represents the likelihood of that label being associated with the input object. The system then decides which label to assign, generally the label with the highest score.

A similar process is followed in the computation of a saliency map followed by selection of the most salient region. The most salient region is then processed through the next stage of the neuromorphic system. For example, in surveillance systems such as airborne and satellite-based vision systems, a huge amount of data is being captured but only a small fraction of it is worth detailed analysis. A saliency map is first computed. It highlights regions worthy of detailed analysis. Then, a selection system selects the most salient region and passes it to a detailed analysis system, such as a classifier.

In view of the above examples, it will be apparent that there is a need for systems and methods capable of efficiently computing WTA with a small number of cores at a minimum latency. In particular, such efficiencies in computation of WTA allow reduction in the number of hardware cores, allowing miniaturization of systems, and also provides for reduced power consumption and therefore reduction in heat dissipation.

In various embodiments, the present disclosure provides WTA of instantaneous input on neuromorphic systems.

In some embodiments, a WTA network is provided that uses a thermometer-coded input, and efficiently compares multiple input values within a short latency. Such embodiments utilize the TrueNorth BusOR operation, which computes an OR of multiple binary inputs by simply combining those inputs together into one axon. This is an efficient operation that takes place during the routing of spikes, and does not require allocation of neurons on the TrueNorth chip.

In some embodiments, binary input is used. A binary representation is very compact representation but requires a sequential process that takes more time to compare values with higher dynamic range.

In some embodiments, a coding scheme denoted Thermometer-Coded Pairwise Binary (TCPB) coded input is used. This approach combines advantages of thermometer code for quick comparison with the compactness of binary representation for effectively representing and comparing inputs with higher dynamic range.

In some embodiments, to provide a more scalable and compact winner-take-all system, conversion of input population codes to binary codes is provided. This reduces the number of input axons from N (the length of the population code for all the inputs) to $\log_2 N$ for each input. A winner selection neural network is provided on binary coded inputs. Although this approach reduces the footprint on neuromorphic hardware, it requires a delay of $\log_2 N$ ticks for winner selection. To address this, a conversion technique to TCPB is also provided, that converts a population code of length N into a new TCPB code of length $3\lceil\log_2 N/2\rceil$. This encoding is more suitable for neuromorphic system than conventional binary codes and reduces the winner computation delay by a factor of 2, to $\log_2 N/2$. These winner-take-all systems are scalable and use small numbers of cores even for large numbers of inputs. Moreover, these approaches are extremely power-efficient and do not require a recurrence in the network.

Various examples provided herein include both TCPB and a WTA. It will be appreciated that input may be coded in any format, and so various embodiment include additional conversion, for example, a converter from Population code to Thermometer code. In various embodiments, binary input may be received. Binary code may be viewed as a special case of TCPB, in which each code segment of the TCPB is one bit. As set forth below, TCPB with longer segments, such as three bits, is advantageous.

Accordingly, it will be appreciate that while the present disclosure describes a converter from Thermometer code to TCPB, and a converter from Population code, other codes may use additional converters to TCPB and then be processed by the WTA according to the present disclosure. Similarly, a WTA may be used without a converter where the input is already suitable.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

In the theory of artificial neural networks, winner-take-all mechanisms refer to competitive learning neural circuits that can mutually inhibit or excite each other so that in the end the single output neuron that produces a spike, corresponds to the set of input neurons with the highest (or lowest) input activation under some particular metric. The closest equivalent mathematical formalism is the argmax/argmin operation which returns an index from an ordered set of numbers, corresponding to the number with the highest/smallest value. For example, given an ordered set $X=(1,4,2,10,2)$, then $\text{argmax}(X)=4$ because the fourth index with value 10 is the maximum value in X. Winner-take-all (WTA) mechanisms are useful in models of vision or in attention models, to determine the winning class from a set of competing classes or to model the scene location where an active vision system should foveate to next, by determining the most salient position in a saliency map. For example, in object recognition systems, a winner take all mechanism is useful to denote the object present in an image by finding the hypothesis corresponding to the object class with the highest activation. In a saliency/attention system, a winner take all mechanism is useful to denote the object present in an image, by finding the hypothesis corresponding to the object class with the highest activation. In a saliency/attention system, a winner take all mechanism is useful to denote the most salient location in an image, that should be attended to next.

As the class count increases, it leads to a commensurate increase in the dynamic range associated with each class hypothesis. In other words, as the number of object classes increases, the dynamic range associated with each class must be increased. For example, given an object recognition system capable of discriminating amongst 10 classes, a dynamic range of 100 spikes may be sufficient to discriminate between the classes. As used herein, the dynamic range refers to the maximum total number of spikes that a group of neurons may produce. However, to discriminate amongst 1,000 classes, a 100 spike dynamic range makes the construction of a recognition system much more difficult, because classes may be only slightly different from each other, thereby requiring more accurate scores for the correct class be differentiated from the rest.

In neuromorphic hardware, such as the TrueNorth architecture, neurosynaptic cores have dimension 256×256, take input from up to 256 axons, and have 256 neurons, each capable of producing output spikes at up to 1000 spikes per second. A classifier may be required to classify 1000 input images per second—one classification per tick—where each of the output classes is represented by a group of output neurons, and the class with the largest number of spikes within that tick is selected as the classifier prediction. This presents a challenge to construct a high-dynamic-range, high-class-count high-input-rate WTA mechanism, because it is difficult to represent all classes (or even two classes) in one core and to insert in the core all the input spikes it needs to count and compare quickly enough.

The maximum of a set of values may be computed either on-chip by an appropriate network, or off-chip by a CPU or other computing device. The advantage of computing off-chip is simplicity of implementation. It is straightforward to find the largest number within a vector of numbers using a single loop on a CPU. However, the disadvantages of off-chip computation are significant. First, it requires communication of all the classifier output spikes from the neuromorphic chip to the CPU. This large number of spikes requires high communication bandwidth, is time consuming, and consumes large amounts of energy to deliver the information to the CPU. Moreover, the result of the largest value is generally required within the neuromorphic system itself, for consequent computation, such as attention and classification of an object after a saliency WTA computation and detection of the object's location. In these cases, computing the WTA outside the chip is not a viable option due to the power and performance issued outlined above. Furthermore, the WTA computation on the chip may allow computation of all tasks entirely by the neuromorphic chip, thus eliminating the need for a CPU in such a system.

Various coding schemes may be used within a spiking neuromorphic system. For example, population code and thermometer code may be used in various circumstances. In general, in population code, the value is the sum of the bits. In thermometer code, the on bits are continuous, from the first pin to the total value. In precision code, only a single spike is used, at the pin representing the value. Accordingly, a maximum on thermometer code can be computed by a bitwise or operator.

More specifically, a population code P with domain $D_n=\{1, \ldots, n\}$ is any function P: $D_n \rightarrow \{0,1\}$. A population code refers to any set of spikes that may enter a corelet input connector in the same tick, where the coded value is represented by the number of spikes. For any sequence of population codes $P_1: D_n, \ldots, P_t:D_n$ that enter a corelet's input connector over a sequence of t consecutive ticks, there exists a unique thermometer code T: $D_{n*t}-\{0,1\}^{n*t}$ that can represent, in a single tick, the exact same number of input spikes that enter the corelet. A thermometer code T with domain $D_n=\{1, \ldots, n\}$ is a function T: $D_n \rightarrow \{0,1\}^n$ that satisfies the condition that for any i such that $T(i)=1$ then $T(j)=1$ for all $j<i$ as well. In other words, in a thermometer code there is at most a single interval of indices, starting from index 1, that is assigned by function T a value of 1. In the case of corelets, the domain of T provides a representation for the indices of a connector's pins, and a value of 1 for T(i) denotes an input spike along input pin i. Thus, an input connector takes as input a thermometer code if any set of input spikes that enter the corelet at any tick t, enter via a set of consecutive input pins, starting from pin 1. An input consisting of no spikes (i.e., $T(i)=0$ for all i) is also a thermometer code, representing the value 0.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
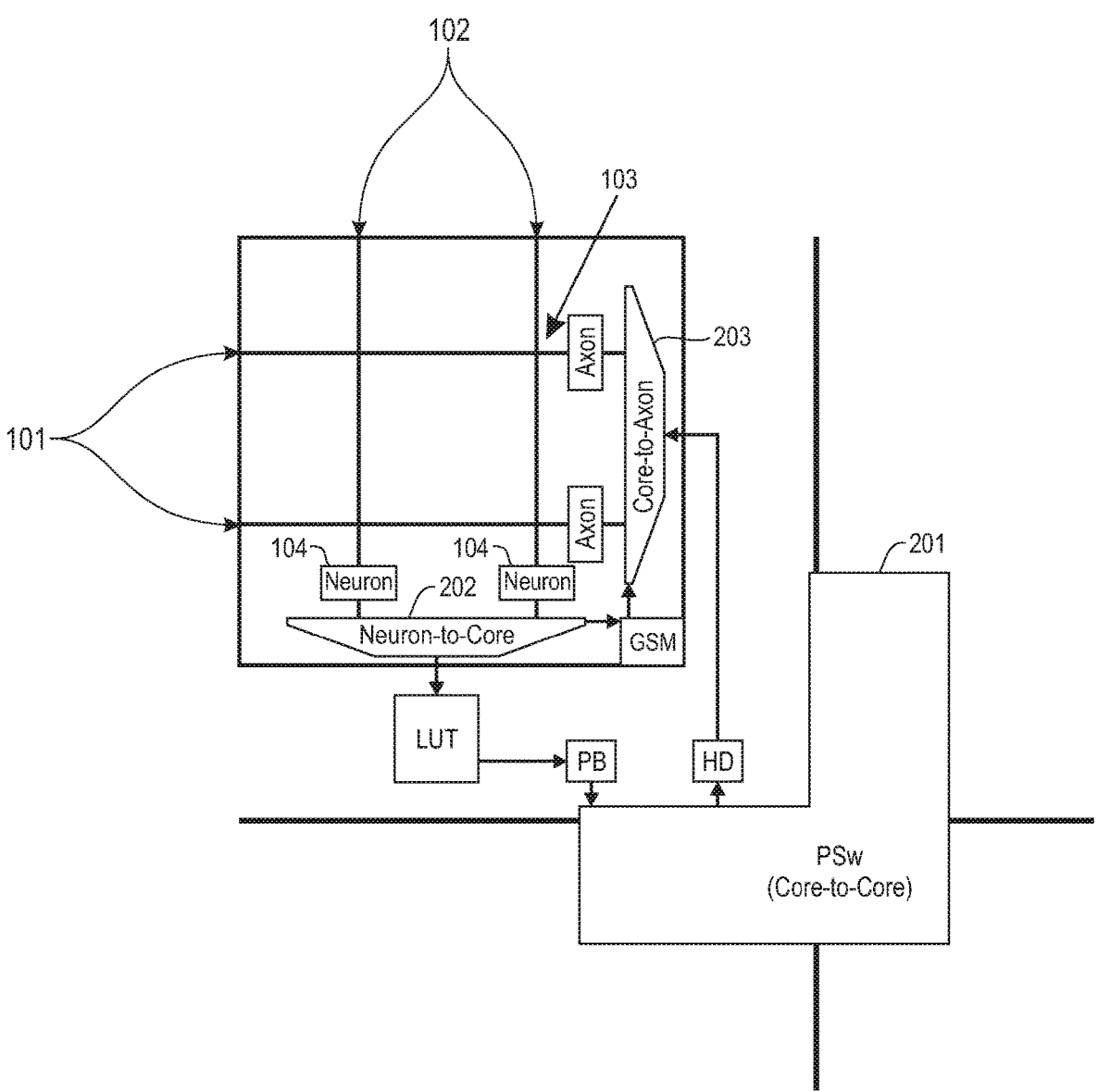
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided. It will be appreciated that although various examples herein are given with respect to TrueNorth, the present disclosure is applicable to a variety of other types of neuromorphic computation.

Figure 3:
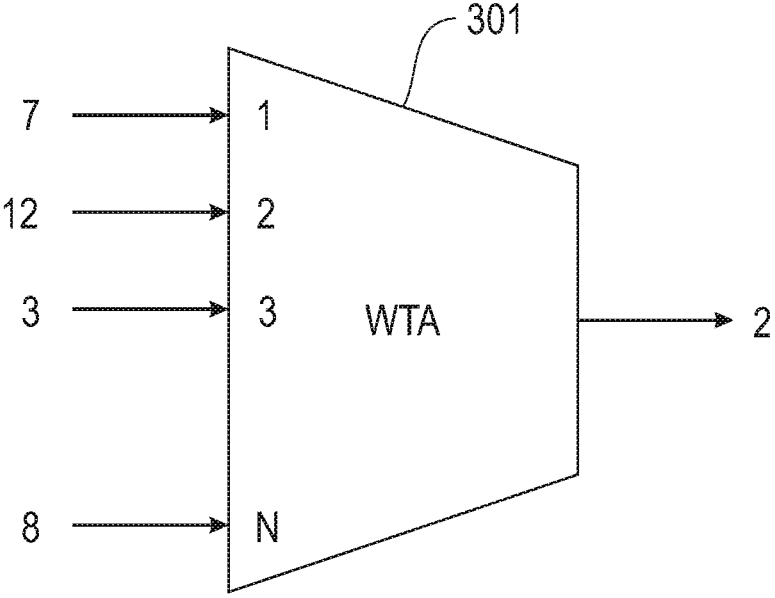
FIG. 3 illustrates a general winner-takes-all block is illustrated according to embodiments of the present disclosure.

Referring to FIG. 3, a general winner-takes-all block is illustrated according to embodiments of the present disclosure. A WTA 301 receives N input values. Each input consists of K bits (e.g., Population code) and encodes a value. In this example, values 7, 12, 3, . . . , 8 are input at indices 1, 2, 3, . . . , N. The network outputs the index of the input(s) with the largest value, in this example, 2.

Figure 4:
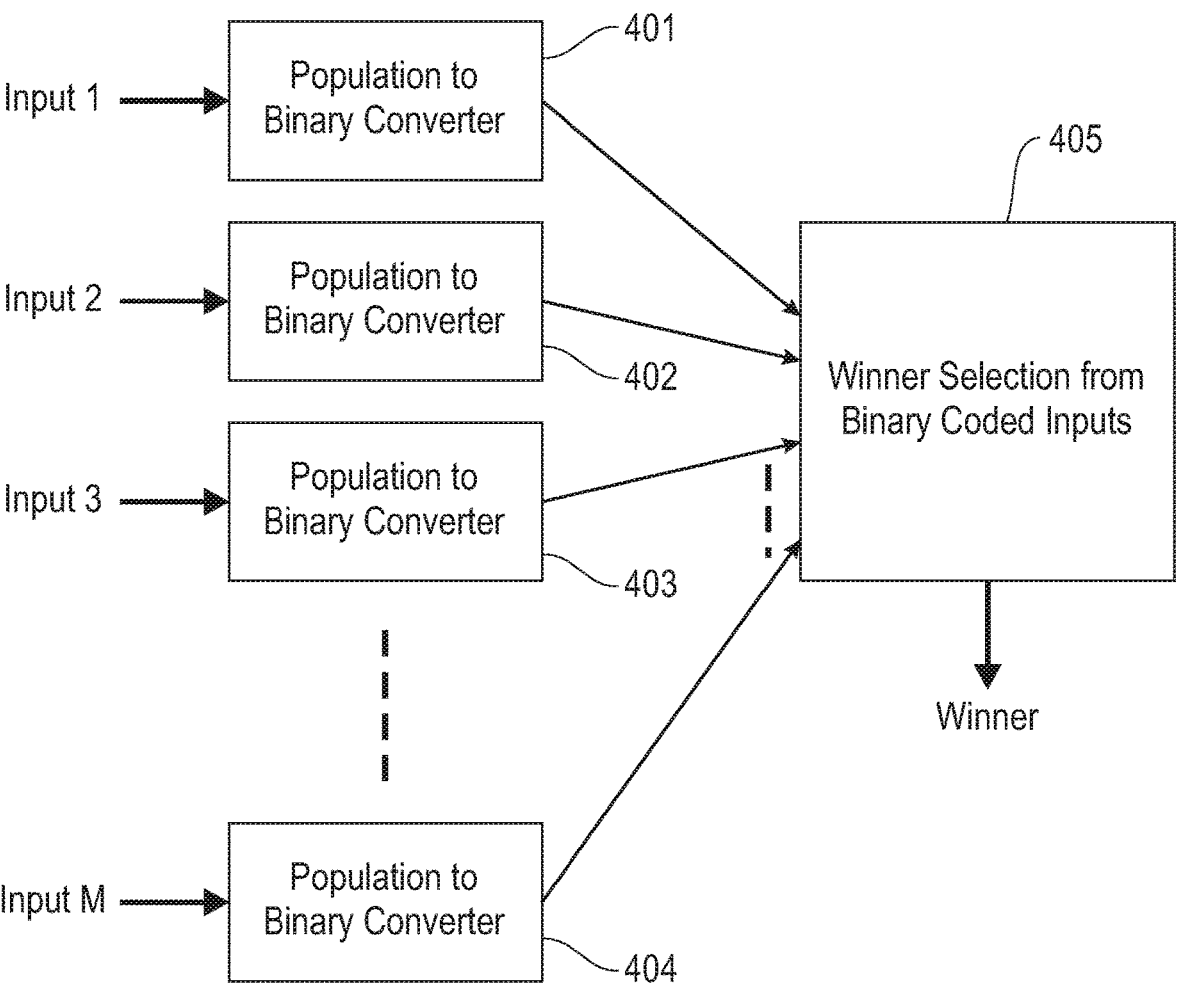
FIG. 4 illustrates a binary code based winner-take-all system according to embodiments of the present disclosure.

Referring to FIG. 4, a binary code based winner-take-all system is illustrated according to embodiments of the present disclosure. In this winner-take-all system, the inputs are provided in population code. The conversion to Binary can be done in two steps: first, convert Population code to Thermometer code, and then convert the Thermometer code to Binary code. As described above, thermometer code is a population code where, for K events at a given tick, all K events arrive on a continuous set of pins, from pin 1 to pin K. If the input is given in a different coding method it is first converted to thermometer code. The winner(s) is selected by finding the largest value and suppressing the smaller-valued inputs. The binary-code based winner-take-all system consists of population to binary code converter 401 . . . 404 for each input and a winner selection module 405 from binary coded inputs. Neuromorphic network modules for conversion from Population code to Thermometer code, for conversion from Thermometer code to Binary code or to TCPB code, and for winner selection are described below.

In the embodiments of FIG. 4, there are M numbers in the input set and each number is converted into n-bit binary codes by converters 401 . . . 404. As noted, winner selection module 405 generates output spike(s) corresponding to the largest number(s), and no spike for all-zero inputs. Initially, all positive input numbers are marked as winner candidates, for example by setting a winner indicator bit. In some embodiments, this is done by performing a BusOR of all of the bits of each input. Winner selection module 405 then proceeds from most significant input bit position to least significant input bit position. For each bit position, a BusOR is computed among all input values for that bit. The result is then compared to the corresponding bit in each input value. Input values whose corresponding but is equal to the result of the BusOR are retained as winner candidates. Input values whose corresponding bit is not equal to the result of the BusOR are discarded. As noted above, the status of each input may be tracked through a winner bit indicator. Discarded values may be zeroed out by having all bits suppressed. These computations are done by the winner-takes-all neuromorphic network.

After traversing all bit positions of the inputs, each bit position being processed by a subsequent network layer, only the largest value(s) will have the winner candidate bit set, or in embodiments where the values are suppressed, will be the only remaining non-zero value. It will be appreciated that this allows WTA with a number of layers that scales with the length of the input, irrespective of the number of inputs.

Figure 5:
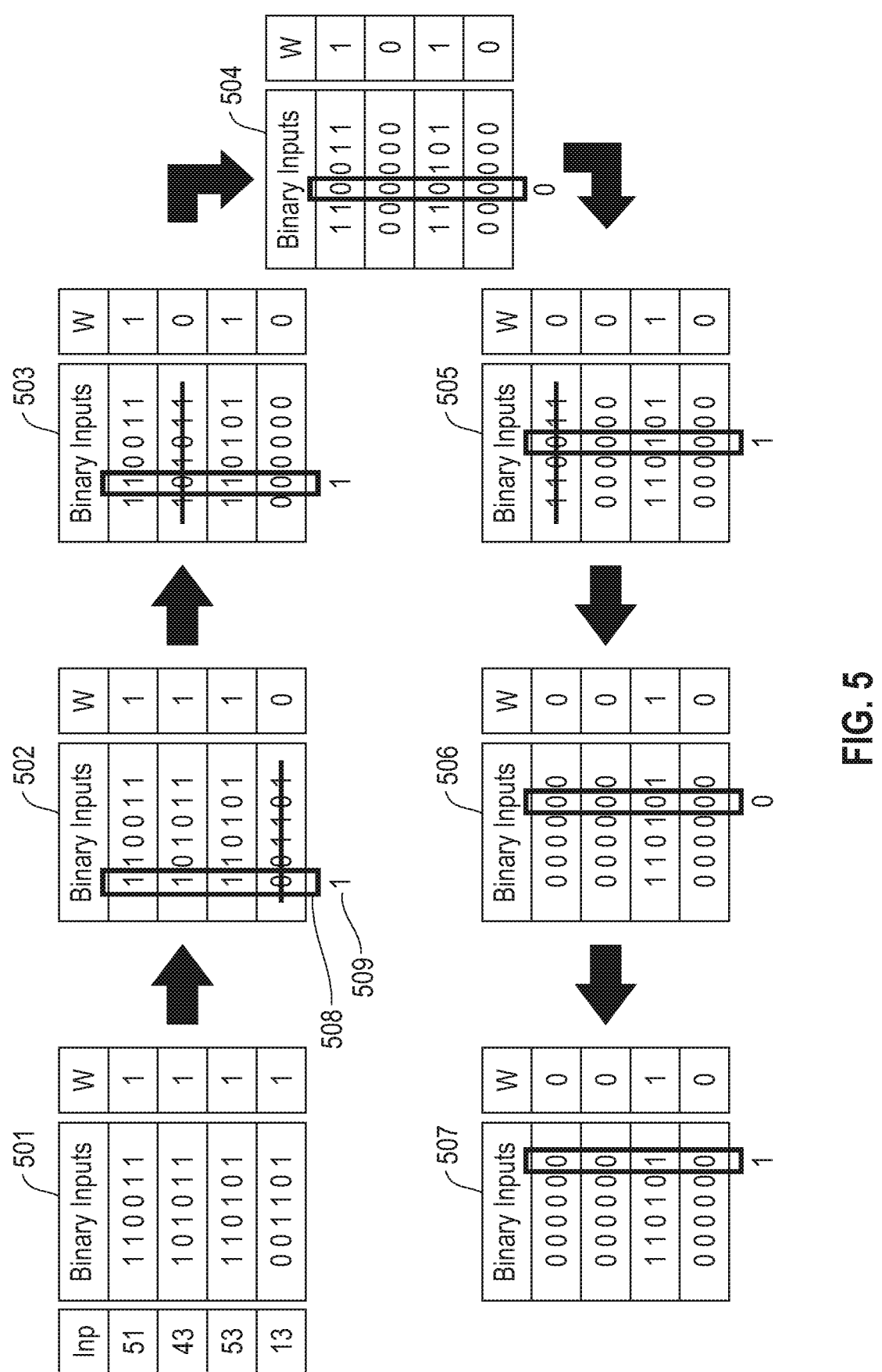
FIG. 5 illustrates the application of WTA to exemplary inputs according to embodiments of the present disclosure.

Referring to FIG. 5, the application of WTA to exemplary inputs is illustrated according to embodiments of the present disclosure. In this example, four inputs of six bits each are provided. At initial state 501, all binary inputs have their candidate bits set. First, the highest order bits 508 of all the inputs are BusORed together, resulting in a value 509 of 1. Then, for each input, the highest order bit is compared with the BusORed value. If the bit fails to match, the corresponding input is no longer a winning candidate and the candidate bit is flipped to 0. Applying this methodology for all the inputs, the result is that in state 502, the fourth input is no longer a candidate because its highest order bit 0 is different from the BusORed value 1. The process will continue with the remaining candidate inputs. Next, the second highest order bits are BusORed together, resulting in a value of 1, and the second highest order bits of all the candidate inputs are compared with the BusORed value. Accordingly, in state 503, the second input is no longer a candidate because its second highest order bit 0 fails to match. Then, the third highest order bits are BusORed together, resulting in a value of 0. Accordingly, in state 504, both the inputs 1 and 3 will continue as candidates as the third highest order bits match with the corresponding BusORed value 0. Following this process for the fourth highest order bits, in state 505, the first input is no longer a candidate because its fourth highest order bit is different from the BusORed value 1. Accordingly, in states 506 and 507, input 3 will continue as the remaining candidate as the fifth and sixth highest order bits match with the corresponding BusORed values 0 and 1. So, input 3 emerges as the winner at the output of the final layer.

Figure 6:
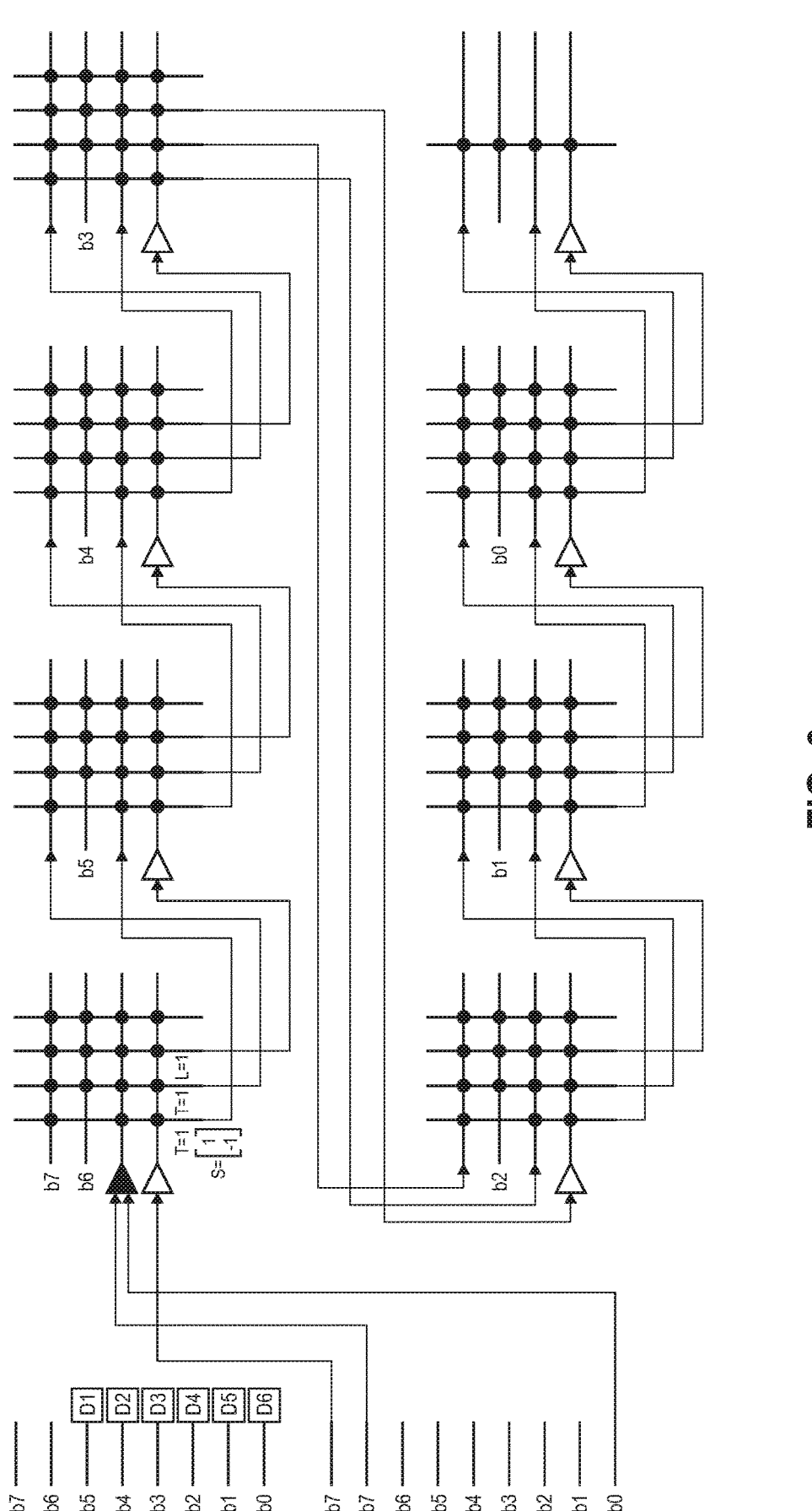
FIG. 6 is a system diagram of a winner selection module on exemplary hardware for 8-bit inputs according to embodiments of the present disclosure.

Referring to FIG. 6, a system diagram is provided of the winner selection module on exemplary hardware for 8-bit inputs according to embodiments of the present disclosure. Although this example shows 8-bit binary WTA, it can be extended for n-bit binary WTA as set out below.

In this example, 3 copies of the binary coded inputs are fed into the winner selection module with delays as shown in the figure where Dk signifies a delay of k ticks. One copy of the inputs are connected to axons with delays. The BusOR of the second copy is connected to the $3^{rd}$ axon. The BusOR of the most significant bits of all inputs are connected to a single axon in each core. There are n sub-modules for n-bit binary codes. In each sub-module, there are two axon types. The threshold for each neuron is 1 and the synaptic weights are 1 and −1. The leak at the first neuron is 0 and −1 for other neurons. The output of the final module generates the winner(s) and the rest of the inputs are suppressed.

Figure 7A:
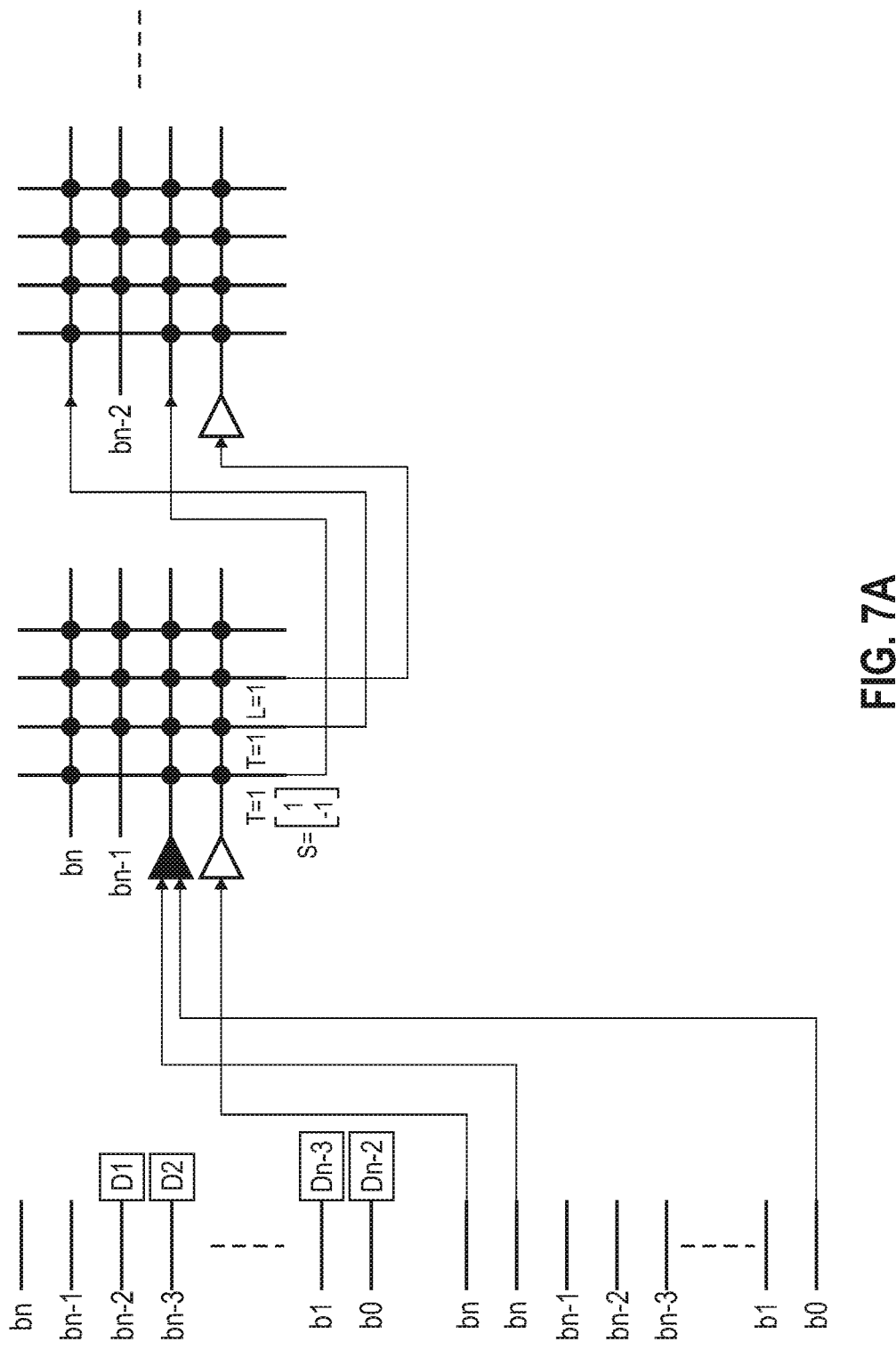
FIGS. 7A-B is a system diagram of a winner selection module on exemplary hardware for n-bit inputs according to embodiments of the present disclosure.
Figure 7B:
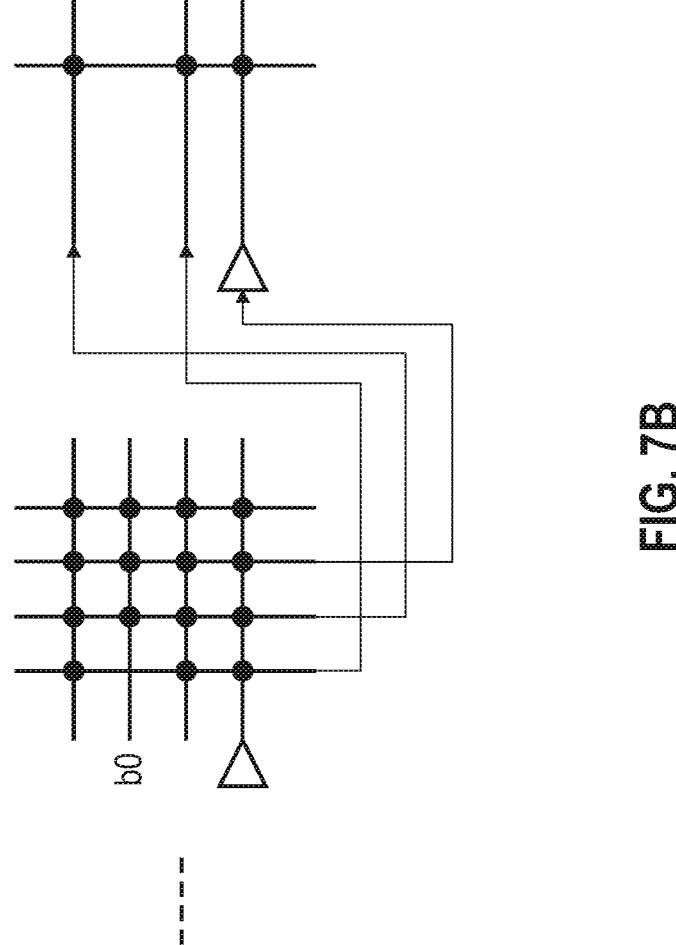

Referring to FIGS. 7A-7B, a system diagram is provided of a winner selection module on exemplary hardware for n-bit inputs according to embodiments of the present disclosure.

Figure 8:
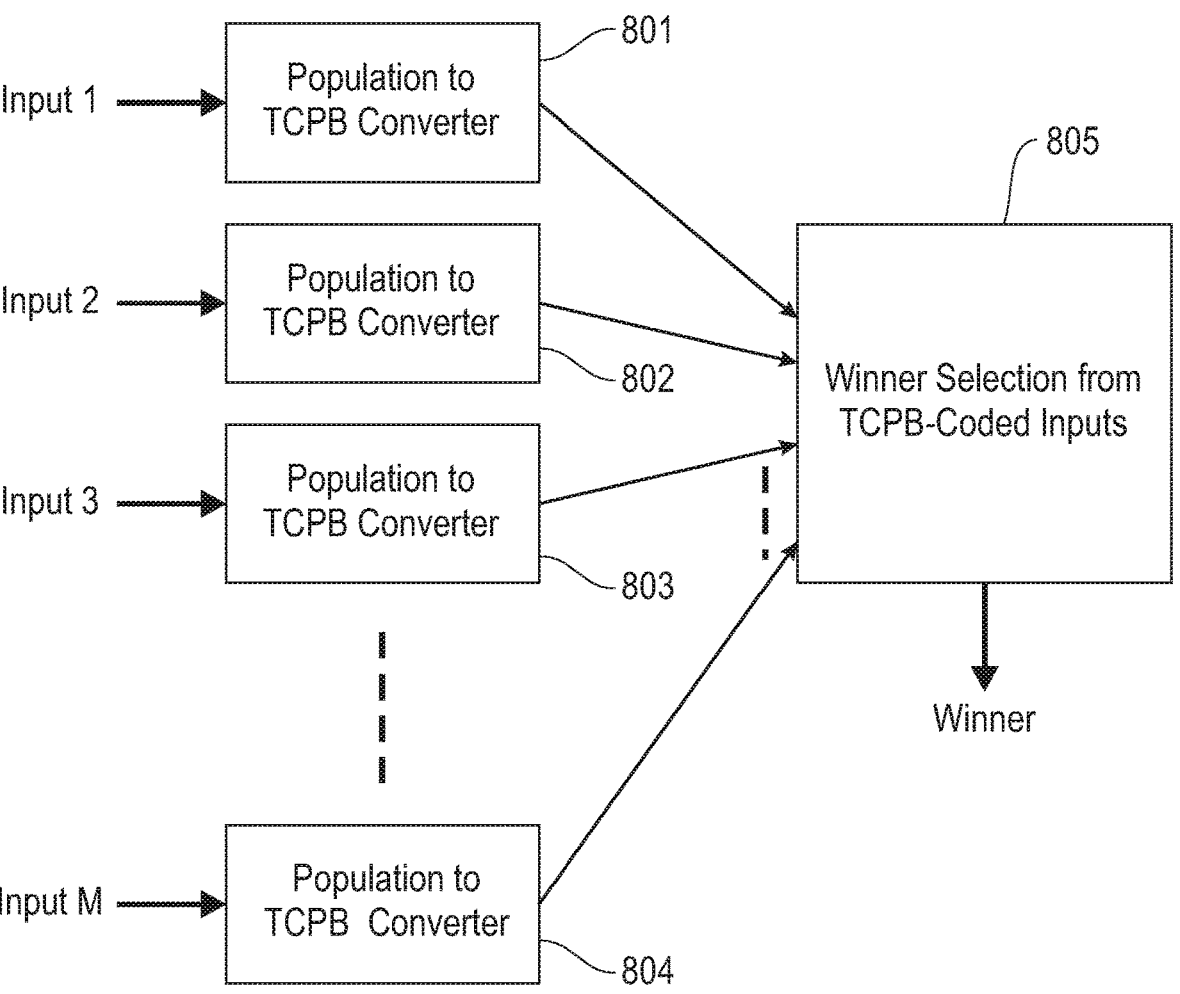
FIG. 8 illustrates a Thermometer-Coded Pairwise Binary (TCPB) based Winner-take-all system according to embodiments of the present disclosure.

Referring to FIG. 8, a Thermometer-Coded Pairwise Binary (TCPB) based Winner-take-all system is illustrated according to embodiments of the present disclosure. In this winner-take-all system, the inputs are provided in Thermometer-Coded Pairwise Binary (TCPB). As in the prior examples, converters 801 . . . 804 convert input population code to a code suitable for WTA computation. In this case, that coding is TCPB.

TCPB encodes each pair of binary bits as a three digit thermometer code. It will be appreciated that two binary bits can represent values of 0 . . . 3. Likewise, three digits of thermometer code can represent values of 0 . . . 3. Accordingly, transcoding of each pair of binary bits in an input may be performed as set out below in Table 1.

TABLE 1

| binary | | thermometer | | |
|---|---|---|---|---|
| $b_1$ | $b_0$ | $t_2$ | $t_1$ | $t_0$ |
| 0 | 0 | 0 | 0 | 0 |
| 0 | 1 | 0 | 0 | 1 |

9

TABLE 1-continued

| binary | | thermometer | | |
|---|---|---|---|---|
| $b_1$ | $b_0$ | $t_2$ | $t_1$ | $t_0$ |
| 1 | 0 | 0 | 1 | 1 |
| 1 | 1 | 1 | 1 | 1 |

As thermometer codes are efficient and more suitable to neuromorphic hardware, binary bits are replaced pairwise by thermometer codes. This enables more efficient computation of the WTA steps outlined above. In particular, the thermometer code, although it uses more bits, allows comparison of the equivalent of two binary bits at once, reducing overall number of cores and overall delay. Further example values are provided below in Table 2.

TABLE 2

| Decimal | Binary | TCPB |
|---|---|---|
| 230 | 11100110 | 111-011-001-011 |
| 210 | 11010010 | 111-001-000-011 |
| 190 | 10111110 | 011-111-111-011 |

It will be appreciated that the alternative length thermometer segments may be used in accordance with the present disclosure. For example, each three-bit binary segment of a binary value may be mapped to a 7-bit thermometer coded segment, as illustrated in Table 3

TABLE 3

| b2 | b1 | b0 | t6 | t5 | t4 | t3 | t2 | t1 | t0 |
|---|---|---|---|---|---|---|---|---|---|
| 0 | 0 | 0 | 0 | 0 | 0 | 0 | 0 | 0 | 0 |
| 0 | 0 | 1 | 0 | 0 | 0 | 0 | 0 | 0 | 1 |
| 0 | 1 | 0 | 0 | 0 | 0 | 0 | 0 | 1 | 1 |
| 0 | 1 | 1 | 0 | 0 | 0 | 0 | 1 | 1 | 1 |
| 1 | 0 | 0 | 0 | 0 | 0 | 1 | 1 | 1 | 1 |
| 1 | 0 | 1 | 0 | 0 | 1 | 1 | 1 | 1 | 1 |
| 1 | 1 | 0 | 0 | 1 | 1 | 1 | 1 | 1 | 1 |
| 1 | 1 | 1 | 1 | 1 | 1 | 1 | 1 | 1 | 1 |

In the embodiments of FIG. 8, there are M numbers in the input set and each number is converted into TCPB codes by converters 801 . . . 804. As noted, winner selection module 805 generates output spike(s) corresponding to the largest number(s), and no spike for all-zero inputs. Initially, all positive input numbers are marked as winner candidates, for example by setting a winner indicator bit. In some embodiments, this is done by performing a BusOR of all of the bits of each input.

Winner selection module 805 then proceeds from most significant input thermometer (in this case a triad) to the least significant input thermometer. For each thermometer, a BusOR is computed in parallel for each bit of the thermometer among all input values for that bit. The results (in this case, three resulting BusOR values) is then compared to the corresponding bits in each input value. This may likewise be performed in parallel. Input values where all bits in the thermometer are equal to the corresponding results of the BusOR are retained as winner candidates. Input values any of whose bits in the thermometer are not equal to the results of the BusOR are discarded. As noted above, the status of each input may be tracked through a winner bit indicator. Discarded values may be zeroed out by having all bits suppressed.

After traversing all bit positions of the inputs, only the largest value(s) will have the winner candidate bit set, or in embodiments where the values are suppressed, will be the only remaining non-zero value. It will be appreciated that this allows WTA with a number of layers that scales with the length of the input, irrespective of the number of inputs.

Figure 9:
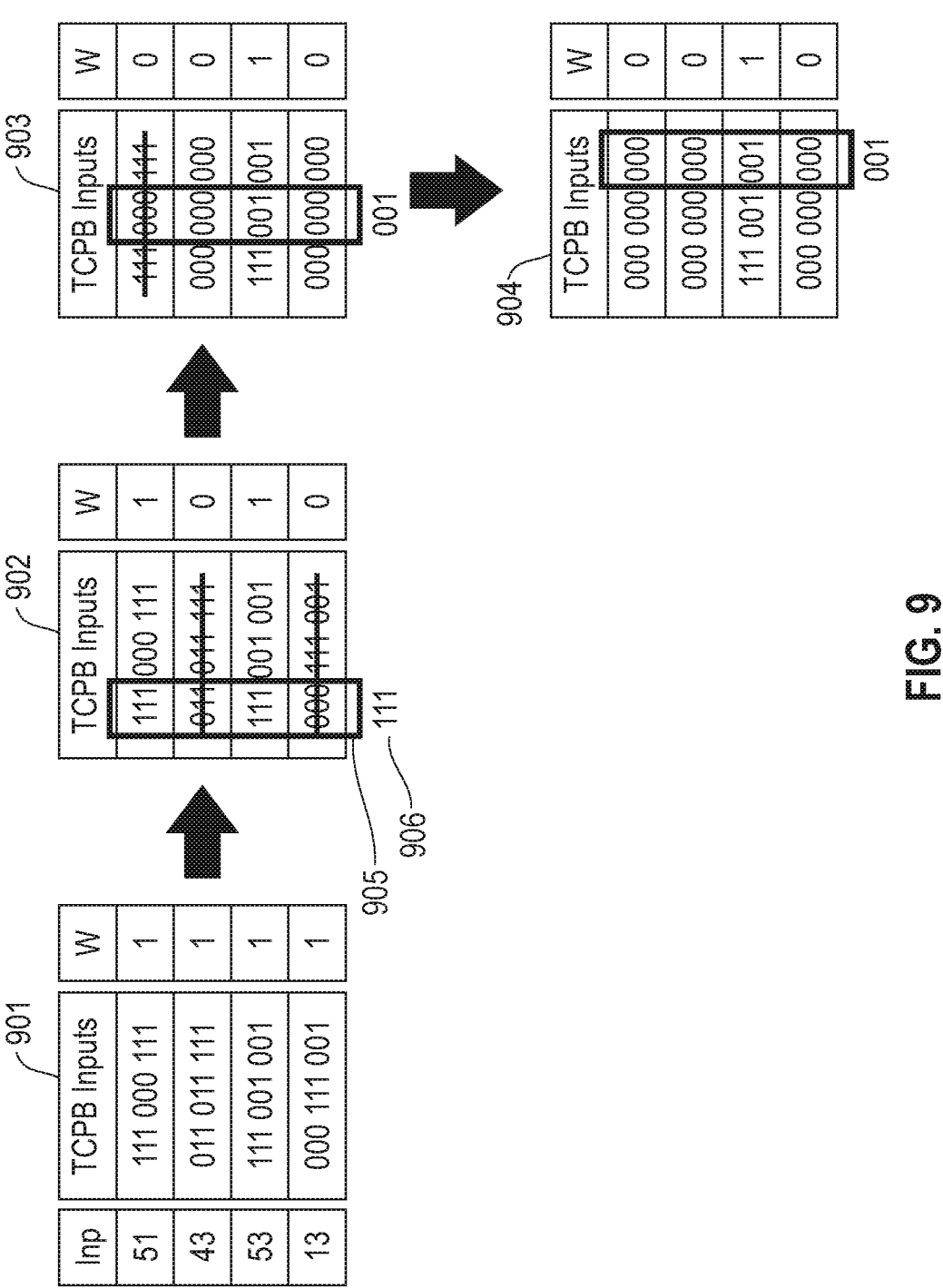
FIG. 9 illustrates the application of WTA to exemplary inputs according to embodiments of the present disclosure.

Referring to FIG. 9, the application of WTA to exemplary inputs according to embodiments of the present disclosure is illustrated. In this example, four inputs are provided, each having three thermometers of three bits each. In view of the above description, it will be apparent that these inputs are equivalent to 6-bit binary values as in FIG. 5. At initial state 901, all inputs have their candidate bits set. First, the highest order thermometers of all the inputs 905 are BusORed together in a bitwise manner, resulting in a value 906 of 111. Then, for each input, each bit of the highest order thermometer is compared with the corresponding bit of the BusORed value, and the input is no longer a candidate if any of the bits mismatch. The result is that in state 902, the second and fourth inputs are no longer candidates, as the highest order thermometers 011 and 000 differ from the BusORed value 111. Next, the second highest order thermometers of the remaining candidates are BusORed in a bitwise manner, resulting in a value of 001. Accordingly, in state 903, the first input is no longer a candidate because the second highest order thermometer 000 does not match the BusORed value 001. Following this process for the third highest order (lowest order thermometers) of the remaining candidates, in state 904, only the third input remains as the winning candidate at the output of the third or final layer of the WTA network. The network has only 3 sublayers for 3 thermometers at each input, and the delay is also reduced to 3 ticks in comparison to 6 ticks in the binary-based WTA as in FIG. 5.

Figure 10:
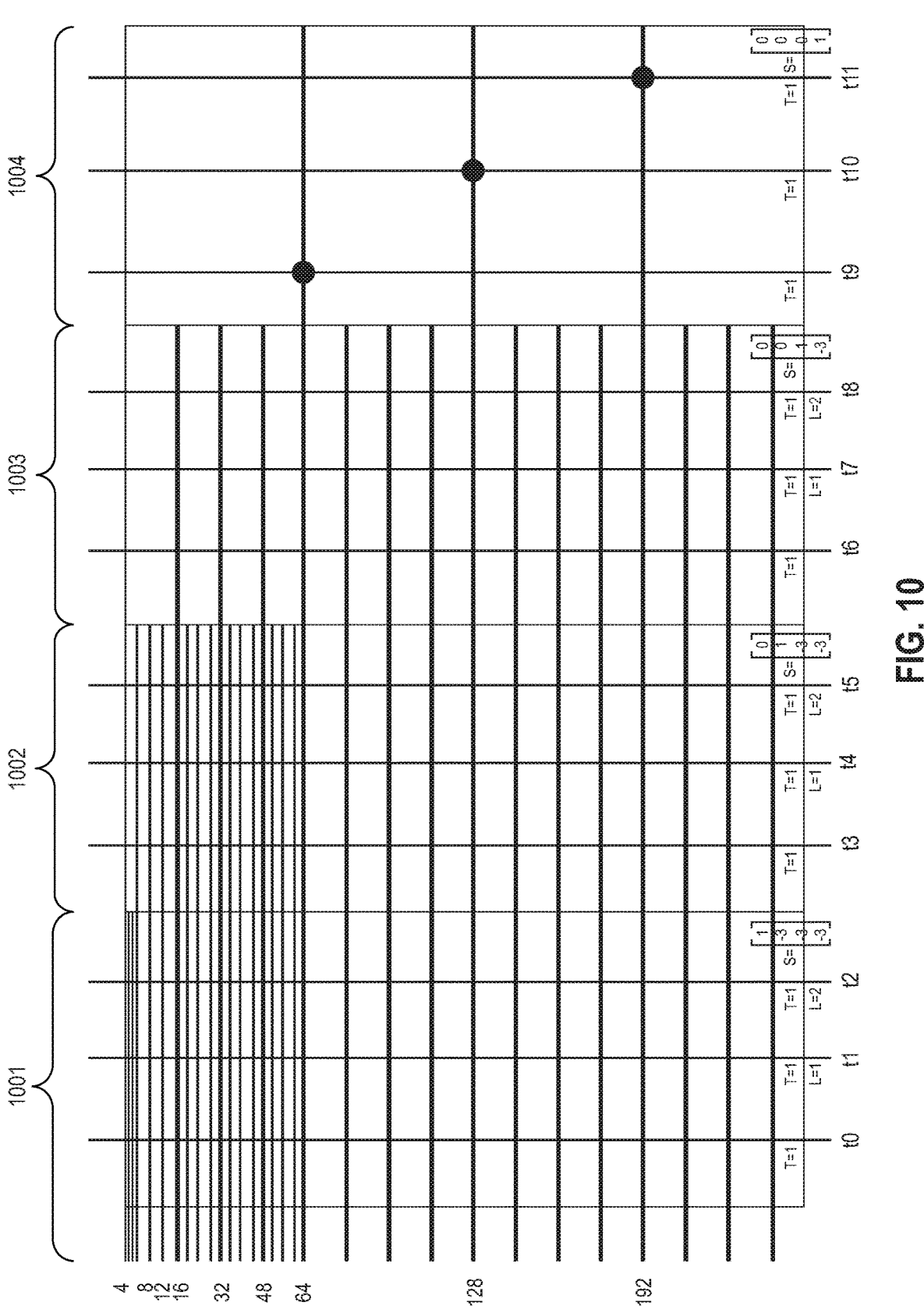
FIG. 10 illustrates an exemplary implementation of a population to TCPB converter is illustrated according to embodiments of the present disclosure.

Referring to FIG. 10, an exemplary implementation of a population to TCPB converter is illustrated. This exemplary embodiment accommodates input of length 255. The thermometer coded inputs are fed into the thermometer to TCPB converter and TCPB codes are generated at the output neurons after one tick. On TrueNorth, this implementation requires one core for population code length of 255. It requires 4 axon types. The inputs 64, 128 and 192 are connected to axon type 4, inputs divisible by 16 from rest of inputs are connected to axon type 3, inputs divisible by 4 from rest of the inputs are connected to axon type 2 and the rest of the inputs are connected to axon type 1. The thresholds of all the neurons are set to 1. Synaptic weights are [1 −3 −3 −3], [0 1 −3 −3], [0 0 1 −3] and [0 0 0 1] in neurons groups 901, 902, 903, and 904. The leak of neurons is L=0, −1, and −2 in the first 3 groups. The number of neurons at each group is 3. A module can also convert TCPB codes to binary codes by converting each 3 bit TCPB code to 2-bit binary codes.

Figure 11A:
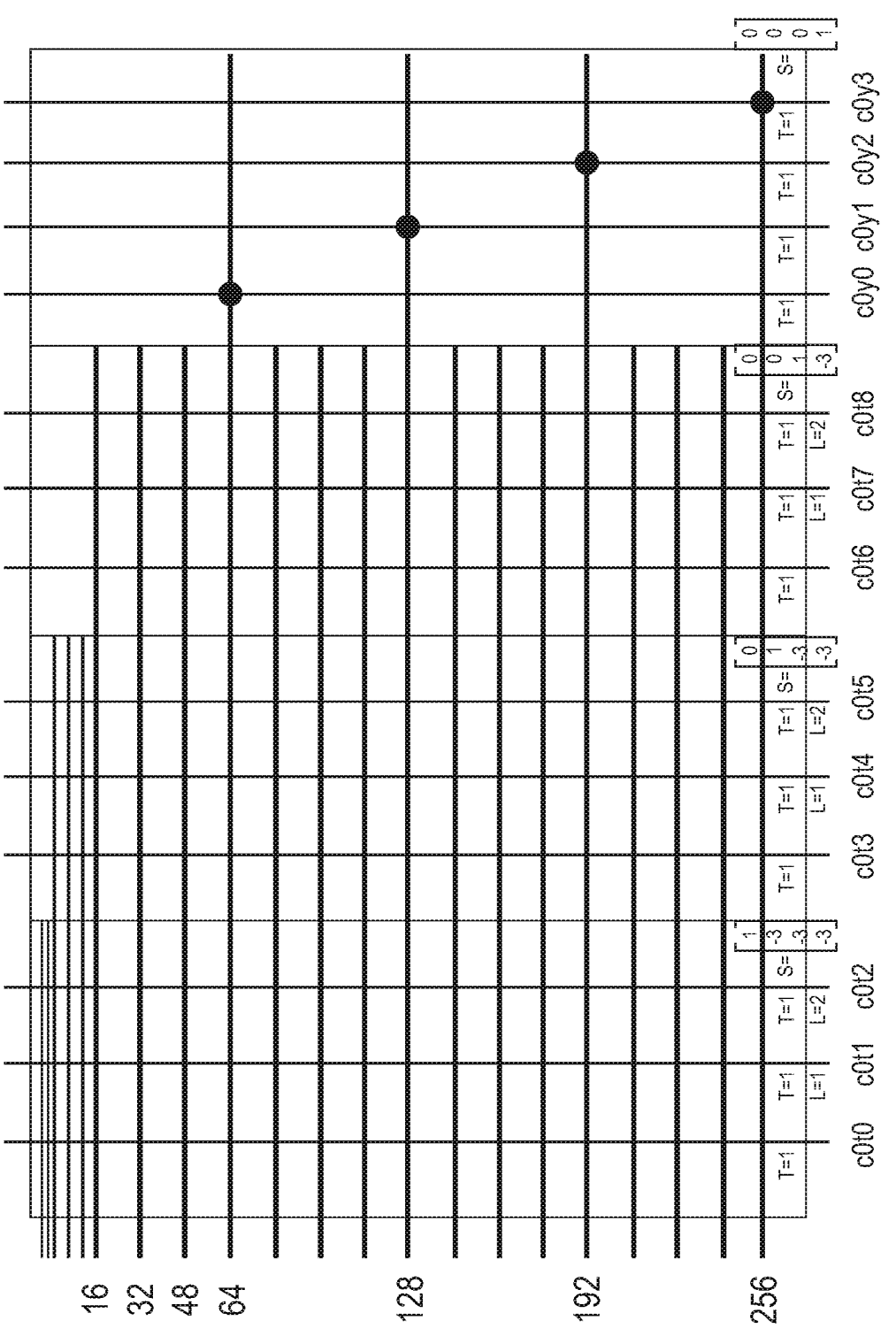
FIGS. 11A-C illustrates a Thermometer to TCPB converter for inputs of population code length up to 1024 according to embodiments of the present disclosure.
Figure 11B:
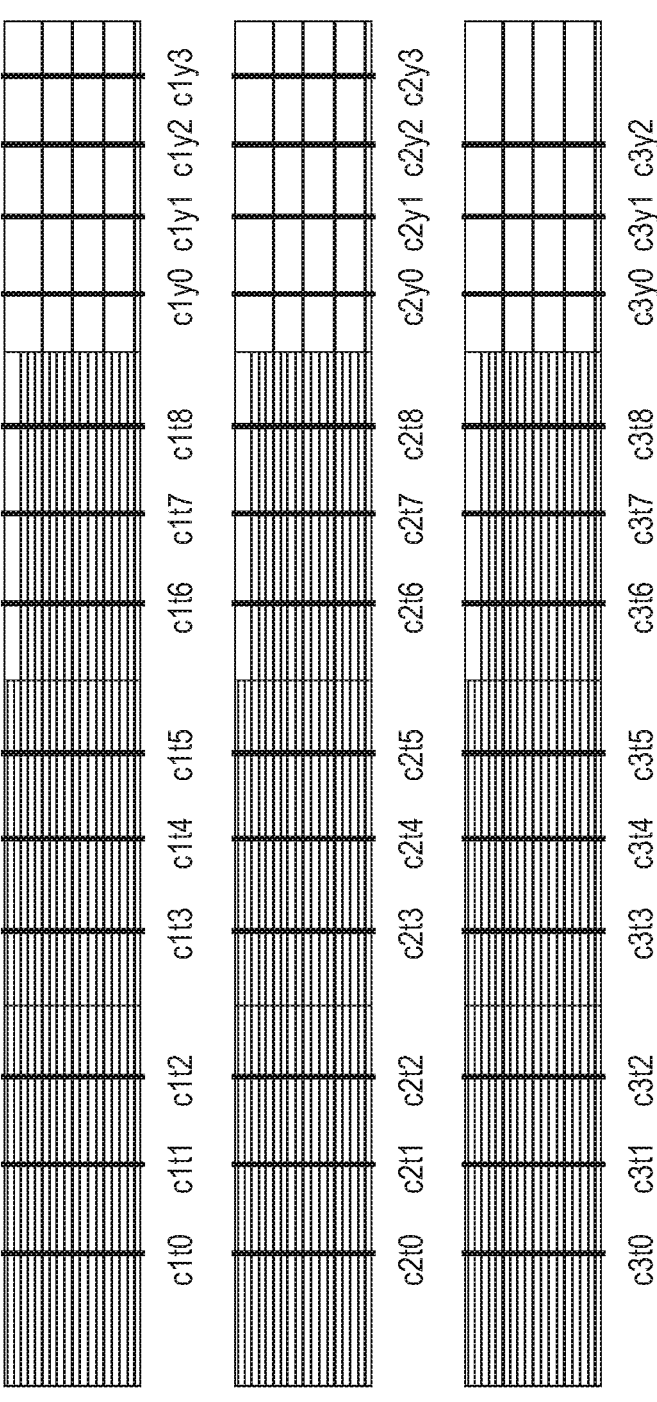
Figure 11C:
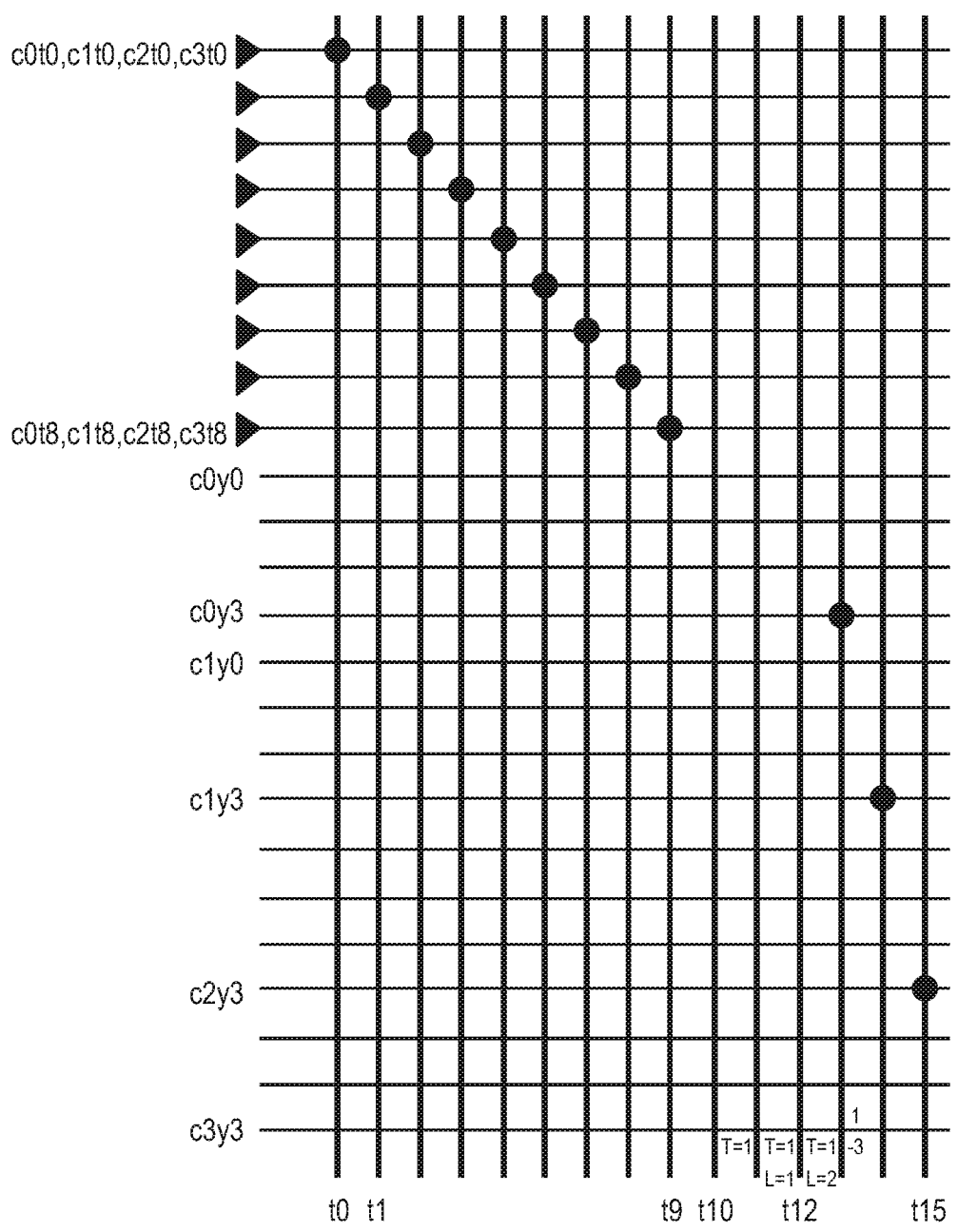

Referring to FIG. 11, a Thermometer to TCPB converter for inputs of population code length up to 1024 is provided. This embodiment requires 5 cores for inputs of length 1024 and generates the TCPB codes after 2 ticks.

Figure 12:
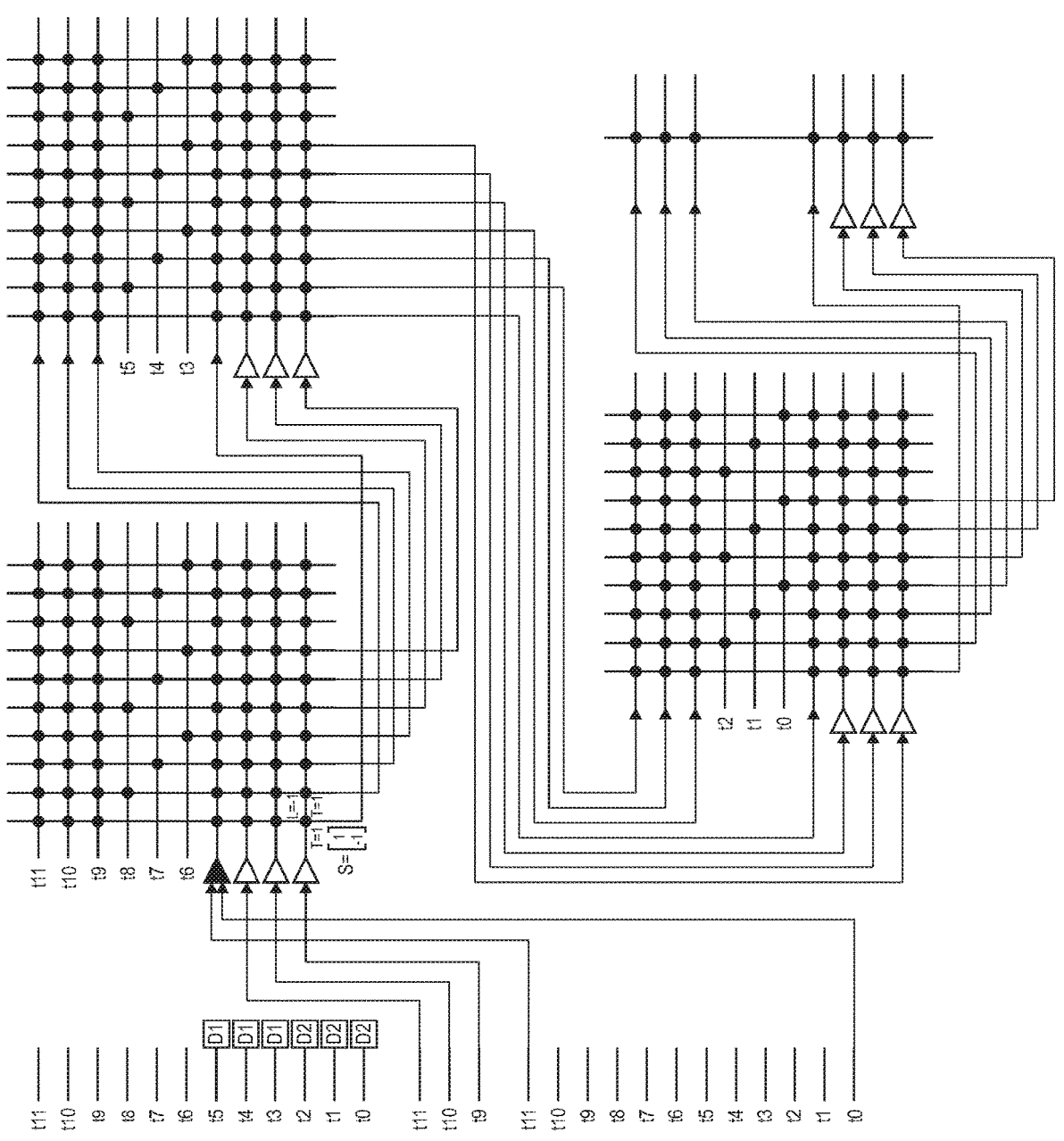
FIG. 12 is a system diagram of a winner selection module on TrueNorth hardware for 12-bit TCPB coded inputs according to embodiments of the present disclosure.

Referring to FIG. 12, a system diagram of a winner selection module on TrueNorth hardware for 12-bit TCPB coded inputs is illustrated. It will be appreciated that this approach can be extended for n-bit TCPB WTA. Three copies of the TCPB-coded inputs are fed into the winner selection module with delays as shown in the figure (where Dk indicates a delay of k ticks). One copy of the inputs is connected to axons with delays. The BusOR of the second copy is connected to the 7th axon and the BusOR of the 3 most significant bits of all inputs are connected to 3 different axons in each core. There are [n/3] sub-modules for n-bit TCPB codes. In each sub-module, there are two axon types. The threshold for each neuron is 1 and the synaptic weights are 1 and −1. The leak at the first neuron is 0 and −1 for other neurons. The output of the final module generates the winner(s) and rest of the inputs are suppressed. The total delay for winner selection is ]n/3[, equal to the number of submodules.

Figure 13A:
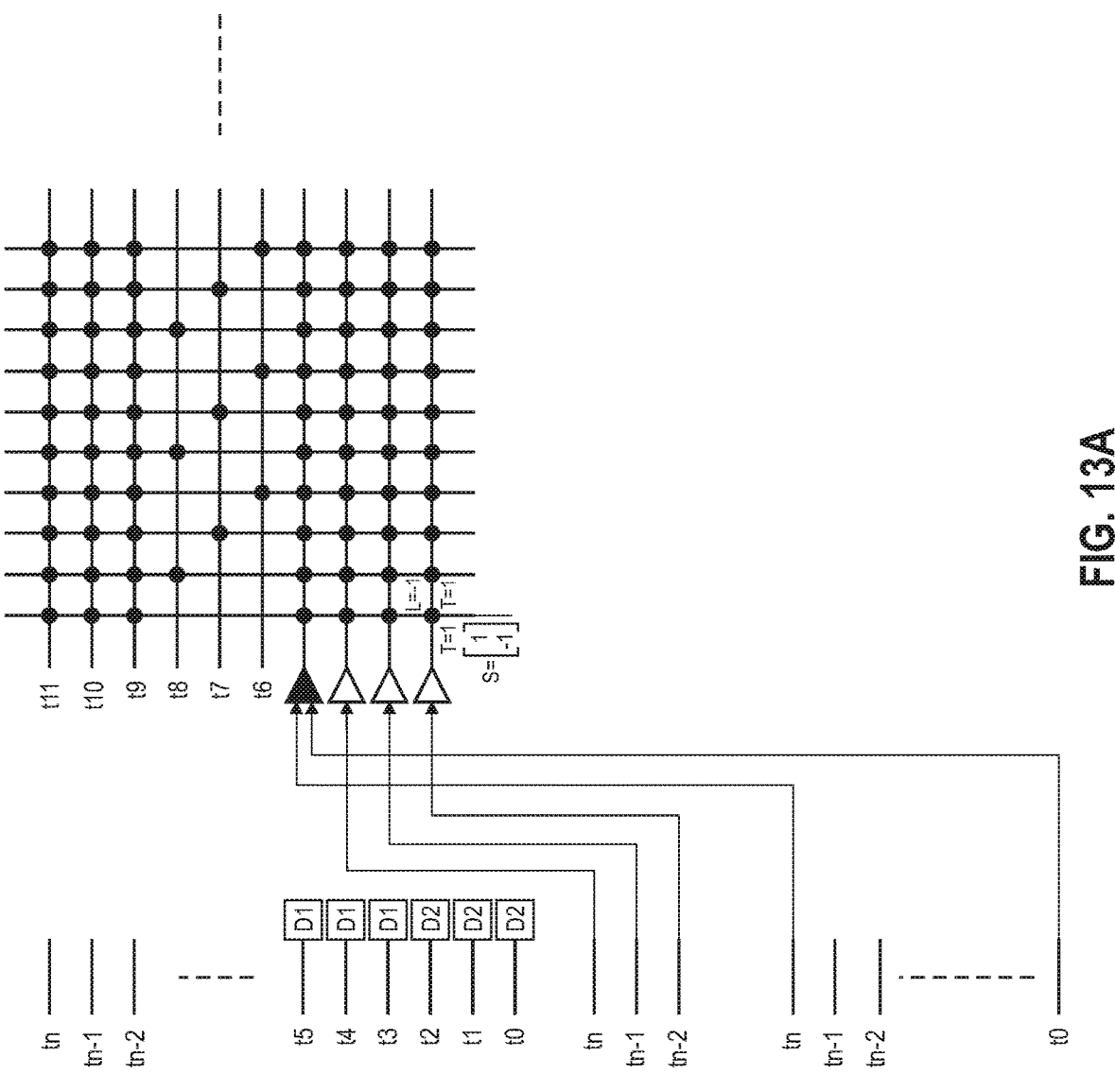
FIGS. 13A-B is a system diagram of an extended winner selection module for n-bit TCPB coded inputs according to embodiments of the present disclosure.
Figure 13B:
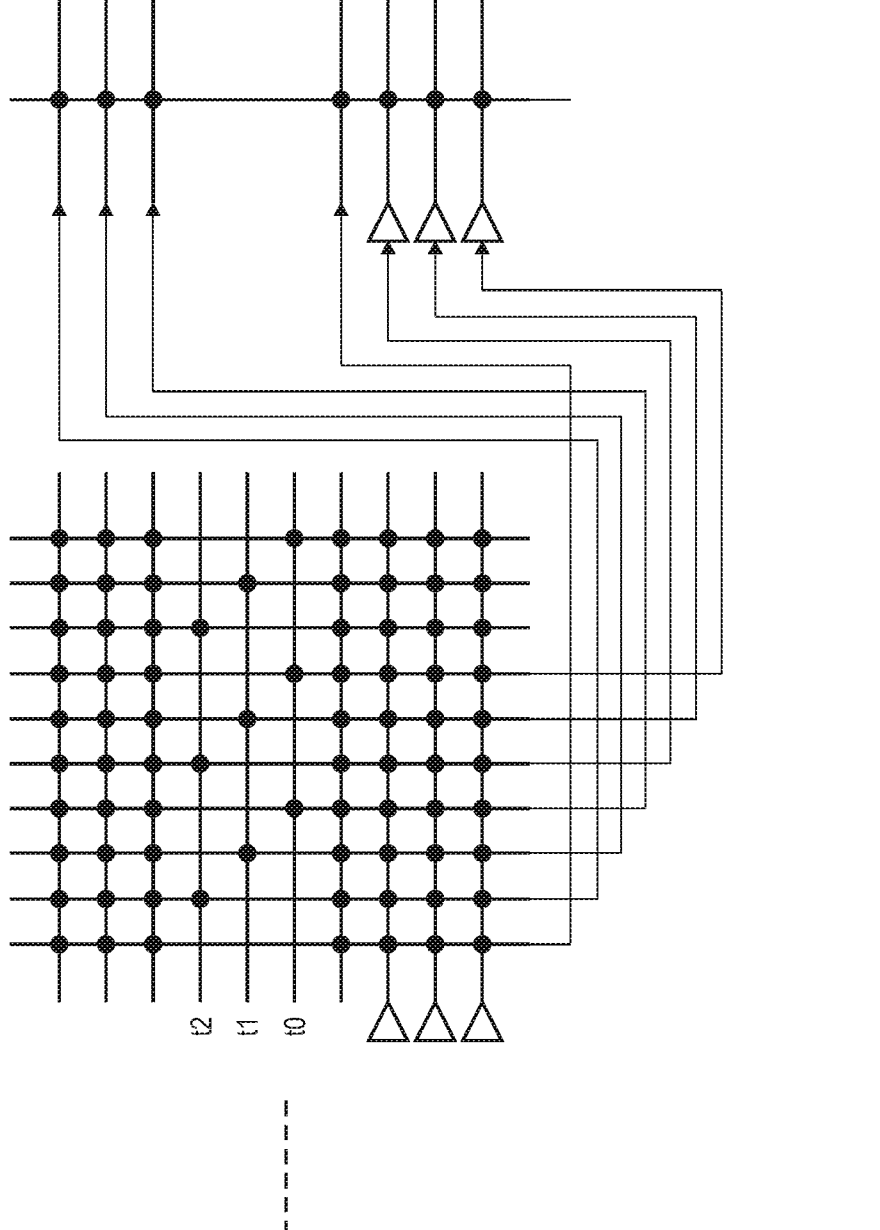

Referring to FIG. 13, a system diagram is provided that extends the winner selection module of FIG. 12 to n-bit TCPB coded inputs.

Exemplary results of systems according to the present disclosure are provided below. In particular, Table 4 illustrates system scaling of a binary based WTA with input count, Table 5 illustrates scaling of thermometer based WTA, and Table 6 illustrates scaling of TCPB based WTA and demonstrates the advantages of TCPB-based WTA compared to the other two.

TABLE 4

| Num-ber of In-puts | Binary-based WTA | | | | | | | |
| | Pop - Therm Converter | | Therm - Bin Converter | | Winner Selection | | Full System | |
| | #Cores | Delay | #Cores | Delay | #Cores | Delay | #Cores | Delay |
| 10 | 10 | 1 | 11 | 2 | 1 | 8 | 22 | 11 |
| 396 | 396 | 1 | 415 | 2 | 40 | 16 | 851 | 19 |

TABLE 5

| Num-ber of In-puts | Thermometer WTA | | | | | | | |
| | Pop - Therm Converter | | Therm - Bin Converter | | Winner Selection | | Full System | |
| | #Cores | Delay | #Cores | Delay | #Cores | Delay | #Cores | Delay |
| 10 | 20 | 1 | — | — | 12 | 3 | 32 | 4 |
| 396 | 792 | 1 | — | — | 405 | 4 | 1197 | 5 |

TABLE 6

| Num-ber of In-puts | TCPB-based WTA | | | | | | | |
| | Pop - Therm Converter | | Therm - TCPB Converter | | Winner Selection | | Full System | |
| | #Cores | Delay | #Cores | Delay | #Cores | Delay | #Cores | Delay |
| 10 | 10 | 1 | 10 | 1 | 2 | 4 | 22 | 6 |
| 396 | 396 | 1 | 396 | 1 | 41 | 8 | 833 | 10 |

Figure 14:
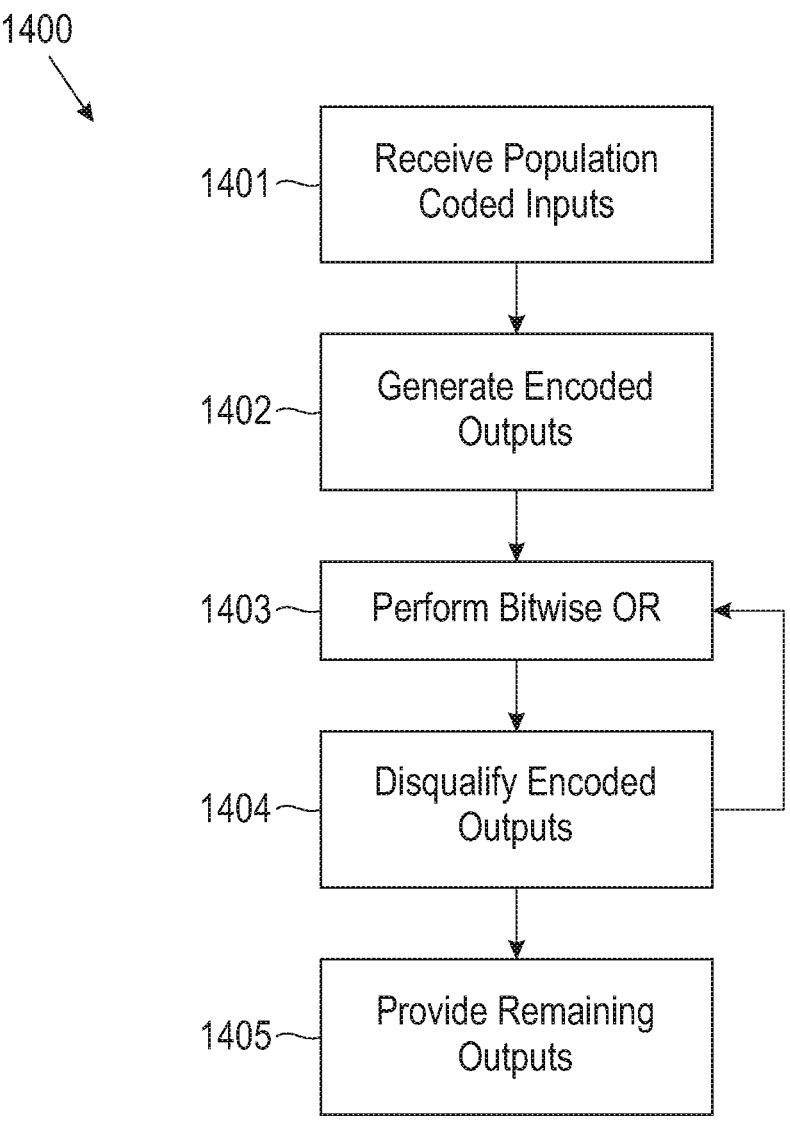
FIG. 14 illustrates a method of winner selection in a neurosynaptic system according to embodiments of the present disclosure.

Referring to FIG. 14, a method of winner selection in a neurosynaptic system is illustrated according to embodiments of the present disclosure. At 1401, a plurality of population coded inputs is received. At 1402, a plurality of encoded output is generated from the plurality of population coded inputs, the encoded outputs each comprising a plurality of segments, each segment corresponding to one or more binary bits. At 1403, proceeding from highest order to lowest order of the segments of the encoded outputs of the encoders, a bitwise OR operation is performed across all segments of equivalent order. At 1404, each encoded output whose bits do not match the result of the bitwise OR operation across all segments of equivalent order is disqualified. At 1405, remaining encoded outputs are output.

Figure 15:
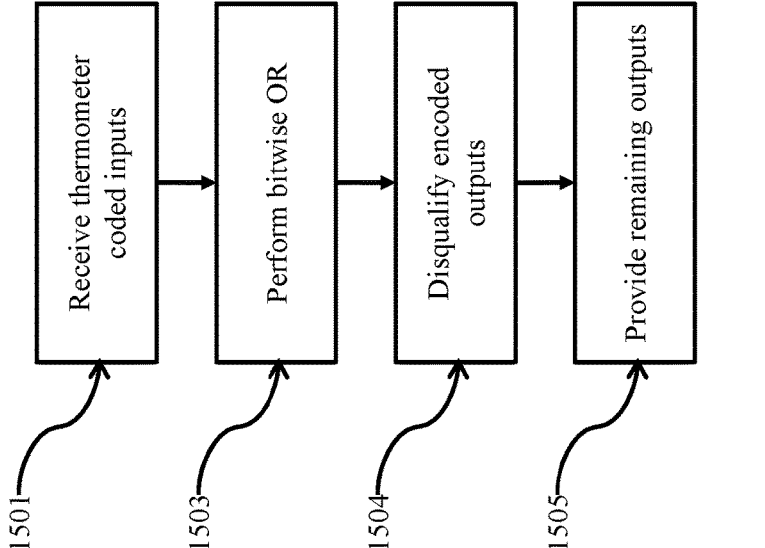
FIG. 15 illustrates a method of winner selection in a neurosynaptic system according to embodiments of the present disclosure.

Referring to FIG. 15, a method of winner selection in a neurosynaptic system is illustrated according to embodiments of the present disclosure. At 1501, a plurality of encoded inputs is received. The encoded inputs each comprise a plurality of segments, each segment corresponding to one or more binary bits. At 1502, proceeding from highest order to lowest order of the segments of the encoded outputs of the encoders, a bitwise OR operation is performed across all segments of equivalent order. At 1503, each encoded output whose bits do not match the result of the bitwise OR operation across all segments of equivalent order is disqualified. At 1504, remaining encoded outputs are output.

Figure 16:
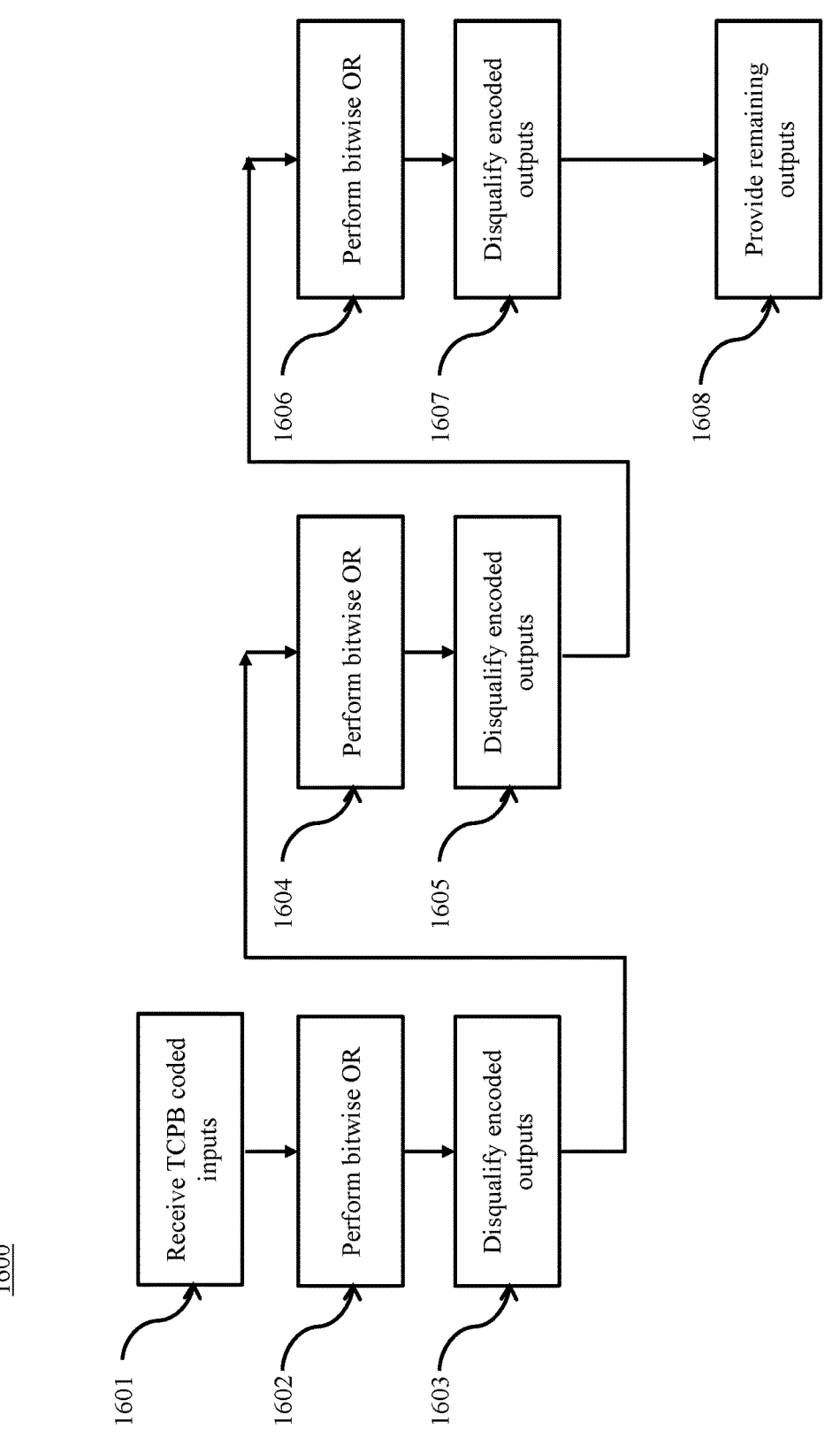
FIG. 16 illustrates a method of winner selection in a neurosynaptic system according to embodiments of the present disclosure.

Referring to FIG. 16, a method of winner selection in a neurosynaptic system is illustrated according to embodiments of the present disclosure. At 1601, a plurality of TCPB coded inputs is received, each comprising three segments, each segment corresponding to one or more binary bits. At 1602, a bitwise OR operation is performed across all segments of highest order. At 1603, each encoded output whose bits do not match the result of the bitwise OR operation is disqualified. At 1604, a bitwise OR operation is performed across all segments of middle order. At 1605, each of remaining encoded output which whose middle bits do not match the result of the bitwise OR operation is also disqualified. At 1606, a bitwise OR operation is performed across all segments of lowest order. At 1607, each of remaining encoded output whose lower bits do not match the result of the bitwise OR operation is disqualified. At 1608, remaining encoded outputs are output.

Figure 17:
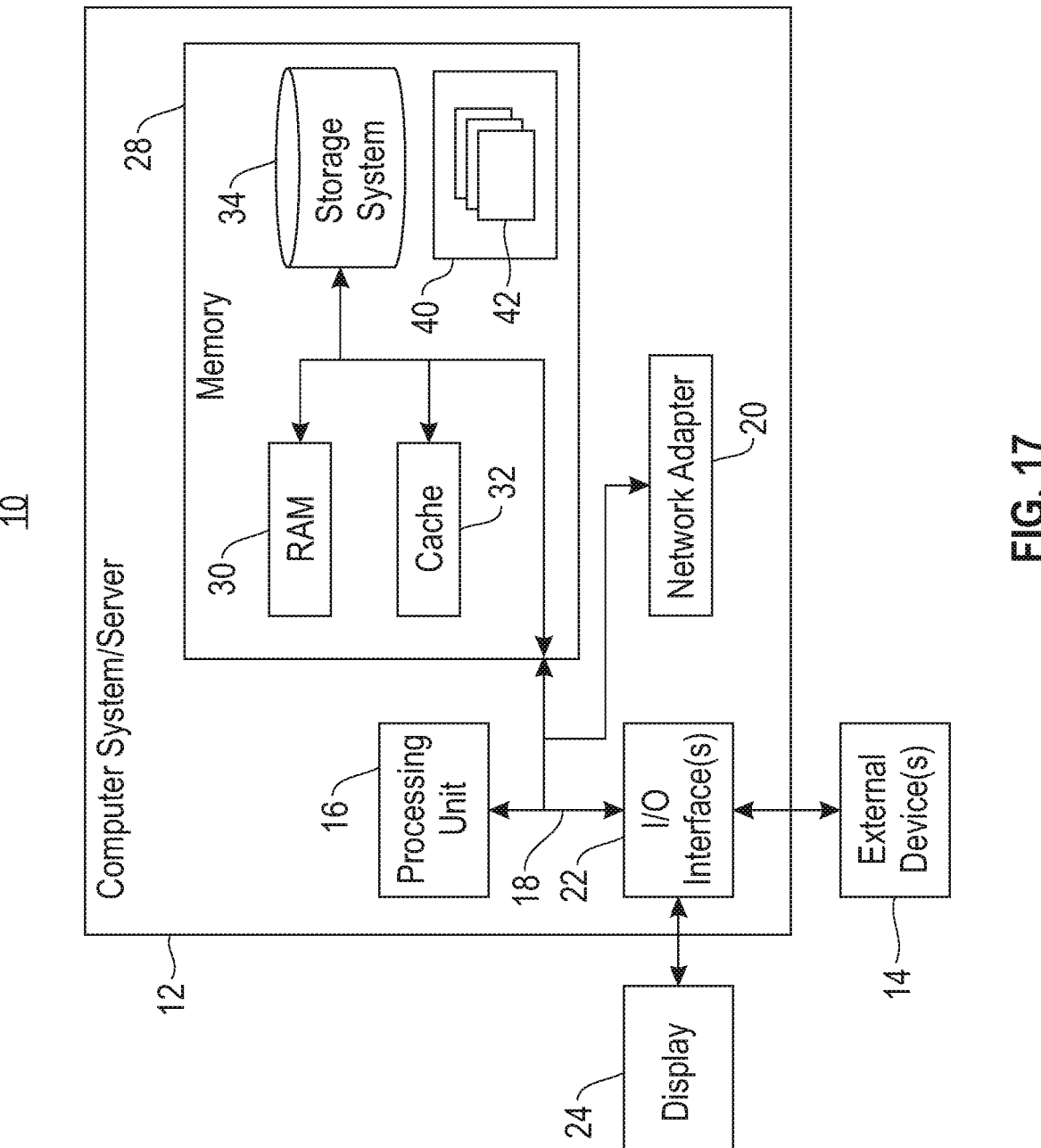
FIG. 17 depicts a computing node according to an embodiment of the present invention.

Referring now to FIG. 17, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neurosynaptic circuit comprising:
a subnetwork configured to provide a plurality of encoded values, each encoded value comprising a plurality of segments, each segment corresponding to a plurality of binary bits, wherein each segment comprises a thermometer code;
a winner selection subnetwork, comprising a network layer for each of the plurality of binary bits, configured to receive the encoded values as input spikes and to perform a method comprising:
proceeding from highest order to lowest order of the segments of the encoded values of the subnetwork, performing a bitwise OR operation across all segments of equivalent order, wherein the bitwise OR operation comprises a BusOR operation for each set of binary bits to be ORed, the BusOR operation combining the set of binary bits together on one axon, the one axon being a wire of the neurosynaptic circuit;
disqualifying each encoded output whose bits do not match a result of the bitwise OR operation across all segments of equivalent order;
outputting output spikes corresponding to remaining encoded values.

2. The neurosynaptic circuit of claim 1, wherein the subnetwork is adapted to receive and relay the encoded values.

3. The neurosynaptic circuit of claim 1, wherein the subnetwork comprises at least one encoder adapted to receive and encode an input.

4. The neurosynaptic circuit of claim 1, wherein the subnetwork comprises a plurality of encoders, each encoder adapted to receive a population coded input and generate one of the encoded values therefrom.

5. The neurosynaptic circuit of claim 1, comprising at least one neurosynaptic core, neurosynaptic chip, simulated neurosynaptic core, or simulated neurosynaptic chip.

6. The neurosynaptic circuit of claim 1, wherein the thermometer code has a length of three.

7. The neurosynaptic circuit of claim 1, wherein the thermometer code has a length greater than three.

8. The neurosynaptic circuit of claim 1, wherein each segment comprises a binary code.

9. The neurosynaptic circuit of claim 1, wherein the method further comprises:
performing the bitwise OR operation of all segments of each encoded value to generate the result; and
disqualifying each encoded output value where the result is zero.

10. A method of selecting an encoded value using neurosynaptic circuitry comprising:
providing a plurality of encoded values as input spikes, each encoded value comprising a plurality of segments, each segment corresponding to a plurality of binary bits, wherein each segment comprises a thermometer code;
proceeding from highest order to lowest order of the segments of the encoded values of encoders, performing a bitwise OR operation across all segments of equivalent order, wherein the bitwise OR operation comprises a BusOR operation for each set of binary bits to be ORed, the BusOR operation combining the set of binary bits together on one axon, the one axon being a wire of the neurosynaptic circuitry;

disqualifying each encoded output whose bits do not match a result of the bitwise OR operation across all segments of equivalent order;

outputting output spikes corresponding to remaining encoded values.

11. The method of claim 10, further comprising:

receiving a plurality of inputs; and encoding the plurality of inputs to provide the encoded values.

12. The method of claim 10, further comprising:

receiving a plurality of population coded inputs; and encoding the plurality of population coded inputs to provide the encoded values.

13. The method of claim 10, wherein the method is performed by at least one neurosynaptic core, neurosynaptic chip, simulated neurosynaptic core, or simulated neurosynaptic chip.

14. The method of claim 10, wherein the thermometer code has a length of three.

15. The method of claim 10, wherein the thermometer code has a length greater than three.

16. The method of claim 10, wherein each segment comprises a binary code.

17. The method of claim 10, wherein the method further comprises:

performing the bitwise OR operation of all segments of each encoded output to generate the result; and disqualifying each encoded output where the result is zero.

\*   \*   \*   \*   \*